US012209458B2

(12) United States Patent
Spencer et al.

(10) Patent No.: US 12,209,458 B2
(45) Date of Patent: Jan. 28, 2025

(54) LADDER STABILIZING APPARATUS

(71) Applicant: Ladder Spike Inc., St. John's (CA)

(72) Inventors: Jordan Spencer, St. John's (CA); Dale Edward Kean, St. John's (CA)

(73) Assignee: Ladder Spike Inc., St. John's (CA)

( * ) Notice: Subject to any disclaimer, the term of this patent is extended or adjusted under 35 U.S.C. 154(b) by 0 days.

(21) Appl. No.: 18/421,025

(22) Filed: Jan. 24, 2024

(65) Prior Publication Data

US 2024/0368943 A1 Nov. 7, 2024

Related U.S. Application Data

(60) Provisional application No. 63/463,643, filed on May 3, 2023.

(51) Int. Cl.

*E06C 7/42* (2006.01)
*E06C 7/44* (2006.01)
*E06C 7/46* (2006.01)

(52) U.S. Cl.

CPC ................ *E06C 7/423* (2013.01); *E06C 7/44* (2013.01); *E06C 7/46* (2013.01)

(58) Field of Classification Search

CPC . E06C 7/188; E06C 7/423; E06C 7/44; E06C 7/46

See application file for complete search history.

(56) References Cited

U.S. PATENT DOCUMENTS

| | | |
|---|---|---|
| 429,638 A | 6/1890 | Reese |
| 504,683 A | 9/1893 | Peartree |
| 979,821 A | 12/1910 | Brasington |
| 1,346,831 A | 7/1920 | Lehmann |
| 1,382,833 A | 6/1921 | Hurd |
| 1,733,338 A | 1/1928 | Enke |
| 1,887,495 A | 11/1932 | Carter |

(Continued)

FOREIGN PATENT DOCUMENTS

| | | |
|---|---|---|
| CA | 2233713 A1 | 10/1999 |
| CA | 3068015 A1 | 7/2021 |

(Continued)

OTHER PUBLICATIONS

YouTube website, Who Will Win??? Ladder LockDown-Pro VS Traditional methods of rope and wood!, LadderSpike Inc., accessed Apr. 15, 2024 <https://www.youtube.com/watch?v=VOmfi_WW_xw>.

*Primary Examiner* — Colleen M Chavchavadze
(74) *Attorney, Agent, or Firm* — SMART & BIGGAR LP

(57) ABSTRACT

A ladder stabilizing apparatus comprises a rail mount attachable to a ladder side rail and an auto-retracting belt assembly. The belt assembly comprises a rail interface connectable to the rail mount, a belt housing rotatable relative to the rail interface about a belt housing rotation axis, and a stabilizing belt extending from a belt first end to a belt second end. The belt first end is connected to the belt housing. The stabilizing belt is movable between a belt retracted position, in which the stabilizing belt is substantially wound within the belt housing, and a belt extended position, in which the stabilizing belt is at least partially unwound from the belt housing. The stabilizing belt is biased to the belt retracted position. The belt second end includes an environment anchor.

18 Claims, 15 Drawing Sheets

(56) References Cited

U.S. PATENT DOCUMENTS

| | | | | |
|---|---|---|---|---|
| 2,127,035 | A | 8/1938 | Kirlin | |
| 2,127,884 | A | 8/1938 | Overpeck | |
| 2,152,895 | A | 4/1939 | Longtin | |
| 2,458,076 | A | 3/1947 | Houston | |
| 2,644,504 | A | 7/1953 | Mck | |
| 2,767,898 | A | 10/1956 | Cramer | |
| 2,894,670 | A | 7/1959 | Anderson et al. | |
| 3,233,702 | A | 2/1966 | Feltrop | |
| 3,374,860 | A | 3/1968 | Stewart | |
| 3,474,997 | A | 10/1969 | Hinrichsen | |
| 3,484,814 | A | 12/1969 | Meehan | |
| 3,527,321 | A | 9/1970 | Brown | |
| 3,599,923 | A | 8/1971 | Hunnicutt et al. | |
| 3,618,705 | A | 11/1971 | Waldren | |
| 3,861,500 | A | 1/1975 | Dempsey | |
| 3,882,966 | A | 5/1975 | Fasano | |
| 3,933,222 | A | 1/1976 | Craig, Jr. | |
| 3,948,352 | A | 4/1976 | Larson et al. | |
| 4,007,807 | A | 2/1977 | Pogwizd | |
| 4,014,406 | A | 3/1977 | Easton | |
| 4,039,047 | A | 8/1977 | Larson et al. | |
| 4,085,820 | A | 4/1978 | Cerny | |
| 4,632,220 | A * | 12/1986 | Murrell | E06C 7/44 182/172 |
| 4,683,982 | A | 8/1987 | Baker | |
| 5,054,579 | A | 10/1991 | Moson | |
| 5,064,024 | A | 11/1991 | Barham | |
| 5,139,109 | A | 8/1992 | Clarke | |
| 5,174,412 | A | 12/1992 | Vega | |
| 5,222,575 | A | 6/1993 | Santos | |
| 5,273,133 | A | 12/1993 | Thocher et al. | |
| 5,337,856 | A | 8/1994 | Fillers | |
| 5,542,497 | A | 8/1996 | Macyszyn | |
| 5,678,656 | A | 10/1997 | Lanzafame | |
| 5,718,306 | A | 2/1998 | Baker | |
| 5,865,268 | A | 2/1999 | Finneran et al. | |
| 5,908,085 | A | 6/1999 | Lovelady | |
| 5,918,699 | A | 7/1999 | Summers | |
| 6,044,929 | A | 4/2000 | Wishner | |
| 6,196,353 | B1 | 3/2001 | Howard | |
| 6,293,367 | B1 | 9/2001 | Gulseth | |
| 6,336,521 | B1 | 1/2002 | Dennis | |
| 6,401,866 | B1 | 6/2002 | Roy | |
| 6,450,292 | B1 | 9/2002 | Sheffield | |
| 6,672,427 | B1 * | 1/2004 | Sheffield | E06C 7/42 182/172 |
| 6,935,463 | B2 | 8/2005 | Brewster | |
| 6,948,591 | B2 | 9/2005 | Scott et al. | |
| 6,955,243 | B1 | 10/2005 | Huff | |
| 7,708,251 | B2 | 5/2010 | Watt et al. | |
| 8,261,882 | B2 | 9/2012 | Dangrow et al. | |
| 8,365,865 | B2 * | 2/2013 | Moss | E06C 7/00 182/172 |
| 8,424,642 | B2 * | 4/2013 | Lietz | E06C 7/46 182/172 |
| 9,187,954 | B1 * | 11/2015 | Parsons | E06C 7/48 |
| 9,834,989 | B2 | 12/2017 | Lanzafame | |
| 9,951,558 | B2 * | 4/2018 | Maragliano | E06C 7/188 |
| 10,138,681 | B2 * | 11/2018 | Crawford | E06C 7/188 |
| 10,233,693 | B2 | 3/2019 | Moss et al. | |
| 10,865,602 | B1 * | 12/2020 | Varshavsky | E06C 7/04 |
| 11,261,664 | B2 * | 3/2022 | Harris | F16M 13/02 |
| 11,459,824 | B2 * | 10/2022 | Cohen | E06C 7/14 |
| 2003/0034207 | A1 | 2/2003 | Palmer et al. | |
| 2003/0230455 | A1 | 12/2003 | Armstrong | |
| 2005/0067224 | A1 | 3/2005 | Brewster | |
| 2006/0076192 | A1 | 4/2006 | Jackson | |
| 2006/0254859 | A1 | 11/2006 | Redekas et al. | |
| 2007/0246301 | A1 | 10/2007 | Shaffer | |
| 2007/0284189 | A1 | 12/2007 | Chady | |
| 2007/0284190 | A1 | 12/2007 | Chady | |
| 2008/0078616 | A1 | 4/2008 | Ursitti | |
| 2010/0170748 | A1 * | 7/2010 | Robichaud | E06C 1/345 182/107 |
| 2011/0168492 | A1 | 7/2011 | Johnson | |
| 2011/0232999 | A1 | 9/2011 | Lanzafame | |
| 2011/0290587 | A1 | 12/2011 | Blazin et al. | |
| 2012/0324701 | A1 | 12/2012 | Dangrow et al. | |
| 2014/0000133 | A1 | 1/2014 | Lutkus | |
| 2014/0047782 | A1 | 2/2014 | Fahler | |
| 2014/0138184 | A1 | 5/2014 | Hernandez | |
| 2014/0262616 | A1 * | 9/2014 | Cullum | E06C 7/188 242/384.7 |
| 2017/0009528 | A1 | 1/2017 | Pascut | |
| 2019/0323295 | A1 | 10/2019 | Lanzafame | |
| 2023/0021230 | A1 * | 1/2023 | Santana | E06C 7/188 |

FOREIGN PATENT DOCUMENTS

| | | | |
|---|---|---|---|
| CN | 114084765 | A | 2/2022 |
| DE | 10210867 | A1 | 4/2004 |
| EP | 1231357 | A2 | 11/2001 |
| GB | 363510 | A | 12/1931 |
| GB | 2381554 | A | 7/2003 |
| GB | 2432621 | A | 5/2007 |
| WO | 200058593 | A1 | 10/2000 |
| WO | 2002059444 | A1 | 8/2002 |
| WO | 2005078230 | A1 | 8/2005 |
| WO | 2007015110 | A1 | 2/2007 |
| WO | 2018096403 | A1 | 5/2018 |
| WO | 2023279207 | A1 | 1/2023 |

* cited by examiner

LADDER STABILIZING APPARATUS

FIELD

This disclosure relates generally to the field of ladder safety devices, and more specifically to ladder stabilizing apparatuses that are attachable to a ladder side rail.

INTRODUCTION

A ladder can slip or topple during use due to inadequate engagement with the ground. When the ladder is supported on sloped ground and/or soft soil, the likelihood of slipping or toppling is increased. In turn, this increases the probability of an accident or serious injury to the user.

SUMMARY

The following is intended to introduce the reader to the detailed description that follows and not to define or limit the claimed subject matter.

In one aspect, a ladder stabilizing apparatus is disclosed. The ladder stabilizing apparatus includes a rail mount attachable to a ladder side rail and an auto-retracting belt assembly. The belt assembly includes a rail interface connectable to the rail mount, a belt housing rotatable relative to the rail interface about a belt housing rotation axis, and a stabilizing belt extending from a belt first end to a belt second end. The belt first end is connected to the belt housing. The stabilizing belt is movable between a belt retracted position, in which the stabilizing belt is substantially wound within the belt housing, and a belt extended position, in which the stabilizing belt is at least partially unwound from the belt housing. The stabilizing belt is biased to the belt retracted position. The belt second end includes an environment anchor.

Other aspects and features of the teachings disclosed herein will become apparent to those ordinarily skilled in the art, upon review of the following description of the specific examples of the present disclosure.

DRAWINGS

The drawings included herewith are for illustrating various examples of apparatuses and methods of the present disclosure and are not intended to limit the scope of what is taught in any way. In the drawings.

Further aspects and features of the example embodiments described herein will appear from the following description taken together with the accompanying drawings.

DETAILED DESCRIPTION

Various apparatuses or processes will be described below to provide an example of each claimed invention. No example described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an example of any claimed invention. Any invention disclosed in an apparatus or process described below that is not claimed in this document may be the subject matter of another protective instrument, for example, a continuing patent application, and the applicants, inventors, or owners do not intend to abandon, disclaim, or dedicate to the public any such invention by its disclosure in this document.

As used herein and in the claims, two or more parts are said to be “coupled”, “connected”, “attached”, “joined”, “affixed”, or “fastened” where the parts are joined or operate together either directly or indirectly (i.e., through one or more intermediate parts), so long as a link occurs. As used herein and in the claims, two or more parts are said to be “directly coupled”, “directly connected”, “directly attached”, “directly joined”, “directly affixed”, or “directly fastened” where the parts are connected in physical contact with each other. None of the terms “coupled”, “connected”, “attached”, “joined”, “affixed”, and “fastened” distinguish the manner in which two or more parts are joined together.

Some elements herein may be identified by a part number, which is composed of a base number followed by an alphabetical or subscript-numerical suffix (e.g., 112*a*, or $\mathbf{112}_1$). Multiple elements herein may be identified by part numbers that share a base number in common and that differ by their suffixes (e.g., $\mathbf{112}_1$, $\mathbf{112}_2$, and $\mathbf{112}_3$). All elements with a common base number may be referred to collectively or generically using the base number without a suffix (e.g., 112).

Figure 1:
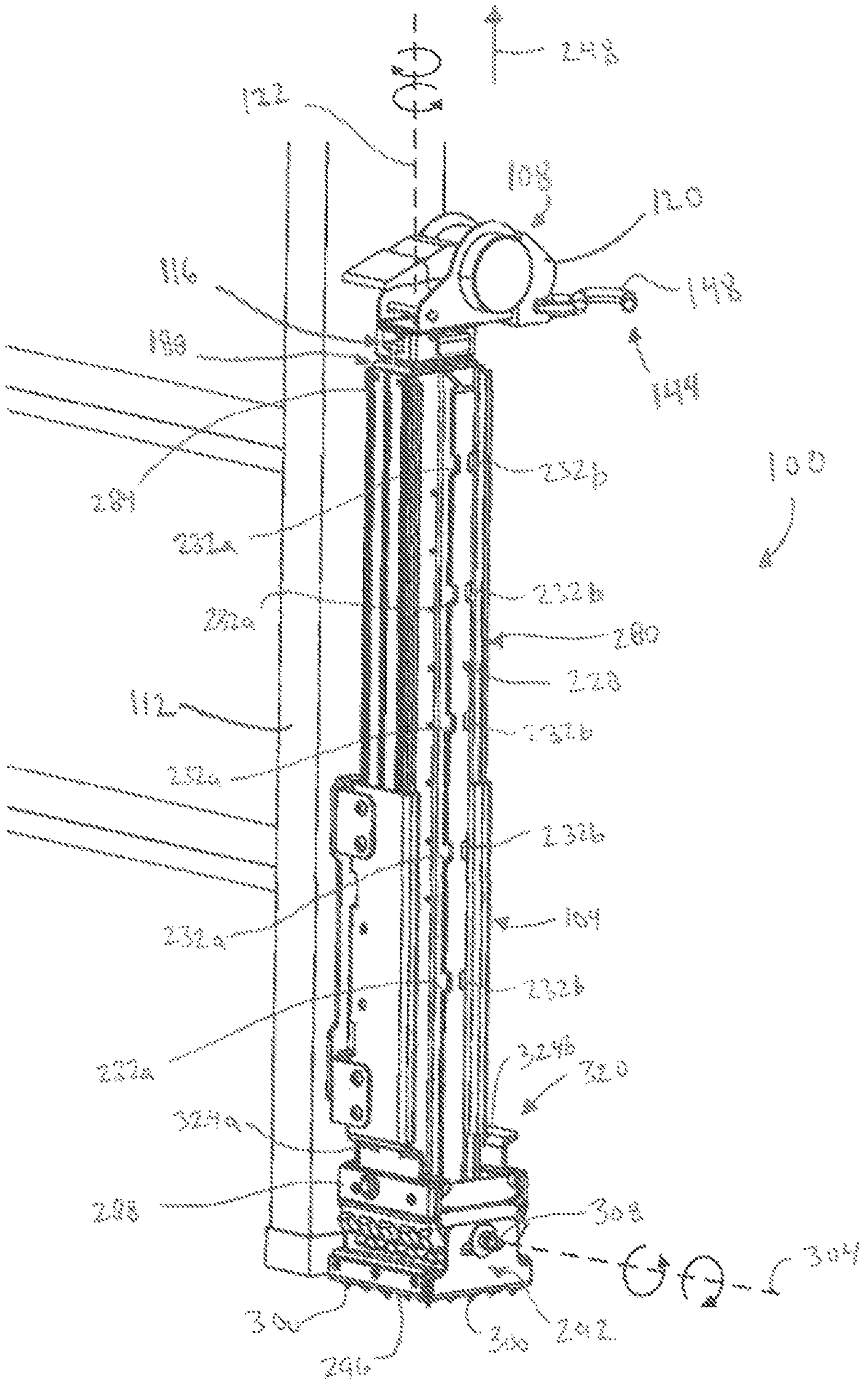
FIG. 1 is a front perspective view of a ladder stabilizing apparatus according to aspects of the teaching disclosed herein attached to a ladder side rail.
Figure 2:
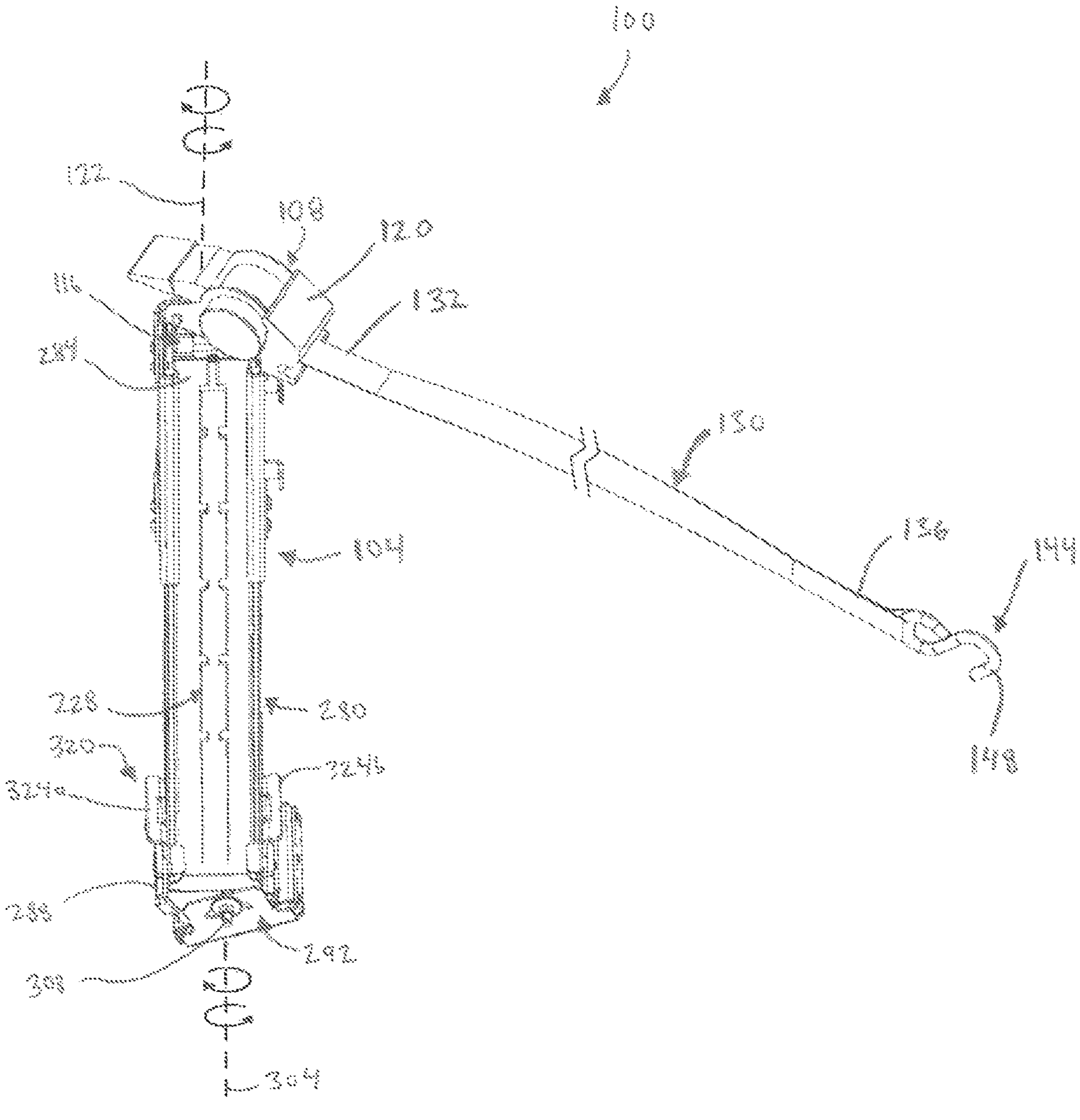
FIG. 2 is a top perspective view of the ladder stabilizing apparatus of FIG. 1 with its stabilizing belt moved to an extended position.

Referring to FIGS. 1 and 2, a ladder stabilizing apparatus 100 in accordance with aspects of the teaching disclosed herein includes anchoring features to help better stabilize a ladder during use. Ladders are generally positioned for use with their lower ends engaged with the ground and their upper ends rested against a vertical support (e.g., building wall, tree trunk, etc.). A ladder can slip or topple during use due to inadequate engagement with the ground and/or the vertical support. In cases where the lower end of the ladder is supported on sloped ground and/or soft soil, the likelihood of slipping or toppling is increased. In turn, this increases the probability of an accident or serious injury to the user. Even in cases where a ladder is positioned with adequate engagement of the ground and vertical support, a user can lose their balance while climbing the ladder and cause the ladder to topple with them on it.

As disclosed in more detail subsequently herein, the ladder stabilizing apparatus 100 mitigates these problems by providing a rail mount 104 attachable to a ladder side rail and an auto-retracting belt assembly 108 connectable to the rail mount 104. The belt assembly 108 includes a stabilizing belt 130 that, in use, is extended from the ladder side rail and secured to an external ladder support (e.g., the ground, a building's wall or roof, a tree, or any another suitable support structure). Securing the stabilizing belt 130 to the external ladder support anchors the ladder, thereby making the ladder safer to use. As an example, the stabilizing belt 130 can be secured to the ground to help prevent the lower end of the ladder from slipping. As another example, the stabilizing belt 130 can be secured to a building wall or roof to help prevent the ladder from toppling over during use.

Referring to FIG. 1, the rail mount 104 is attached to a ladder side rail 112. The rail mount 104 is attachable to the ladder side rail 112 in any manner that provides a rigid connection between the rail mount 104 and the ladder side rail 112. In some examples, the rail mount 104 includes one or more mounting apertures through which fasteners (e.g., screws, bolts, etc.) may pass to attach the rail mount 104 to the ladder side rail 112. Alternatively, or in addition, the rail mount 104 may be configured as a clamp having a pair of spaced apart jaws that are tightenable against opposite sides of the ladder side rail 112. In some examples, the rail mount 104 may be integrated into the ladder side rail 112 (e.g., permanently attached to or integrally formed with the ladder side rail 112).

The belt assembly 108 includes a rail interface 116 connectable to the rail mount 104, and a belt housing 120 rotatably connected to the rail interface 116. Referring to FIG. 2, the stabilizing belt 130 extends from a belt first end 132 to a belt second end 136. The belt first end 132 is connected to the belt housing 120. The stabilizing belt 130 is movable between a belt retracted position (FIG. 1), in which the stabilizing belt 130 is substantially wound within the belt housing 120, and a belt extended position (FIG. 2), in which the stabilizing belt 130 is at least partially unwound from the belt housing 120.

Figure 3:
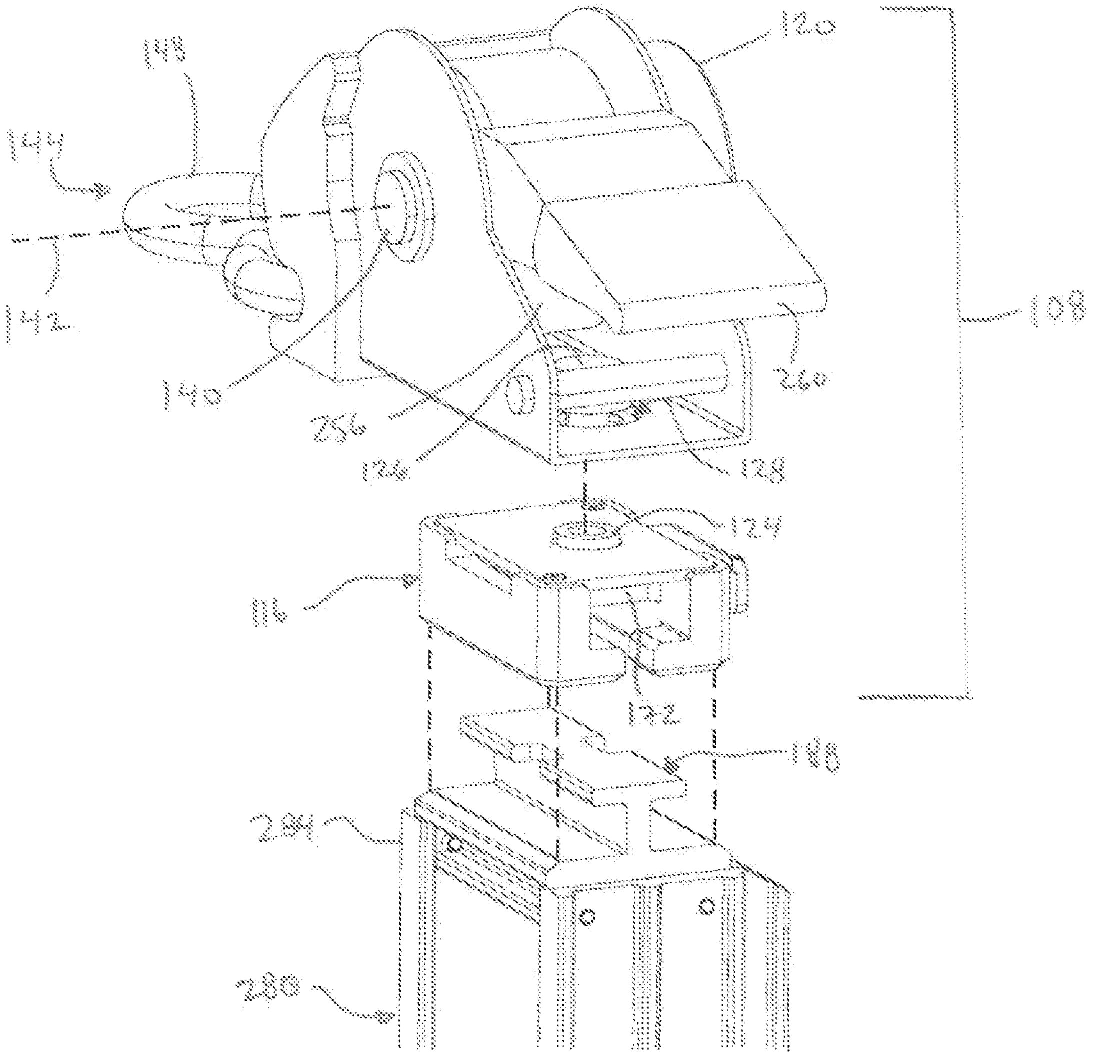
FIG. 3 is an exploded side perspective view of a portion of the ladder stabilizing apparatus of FIG. 1.

Referring to FIG. 3, in the example illustrated, the belt assembly 108 further includes a spool 140 rotatably connected to the belt housing 120. The spool 140 is rotatable relative to the belt housing 120 about a spool rotation axis 142. Rotation of the spool 140 about the spool rotation axis 142 in a first direction winds the stabilizing belt 130 about the spool 140 (i.e., moves the stabilizing belt 130 toward the belt retracted position if it is not already in the belt retracted position). Conversely, rotation of the spool 140 about the spool rotation axis 142 in a second direction, opposite to the first direction, unwinds the stabilizing belt 130 from the spool 140 (i.e., moves the stabilizing belt 130 toward the belt extended position).

The stabilizing belt 130 is preferably biased to the belt retracted position. The stabilizing belt 130 can be biased to the belt retracted position in any suitable manner. For example, the belt assembly 108 may include a torsion spring that applies a rotational force, or torque, to the spool 140. As described above, the spool 140 rotates in the second direction when the stabilizing belt 130 is unwound from the belt housing 120. Tension develops in the torsion spring as the spool 140 rotates in the second direction. Upon release of the developed tension, the torsion spring urges the spool 140 to rotate in the first direction and thereby re-winds the stabilizing belt 130 about the spool 140.

Figure 5:
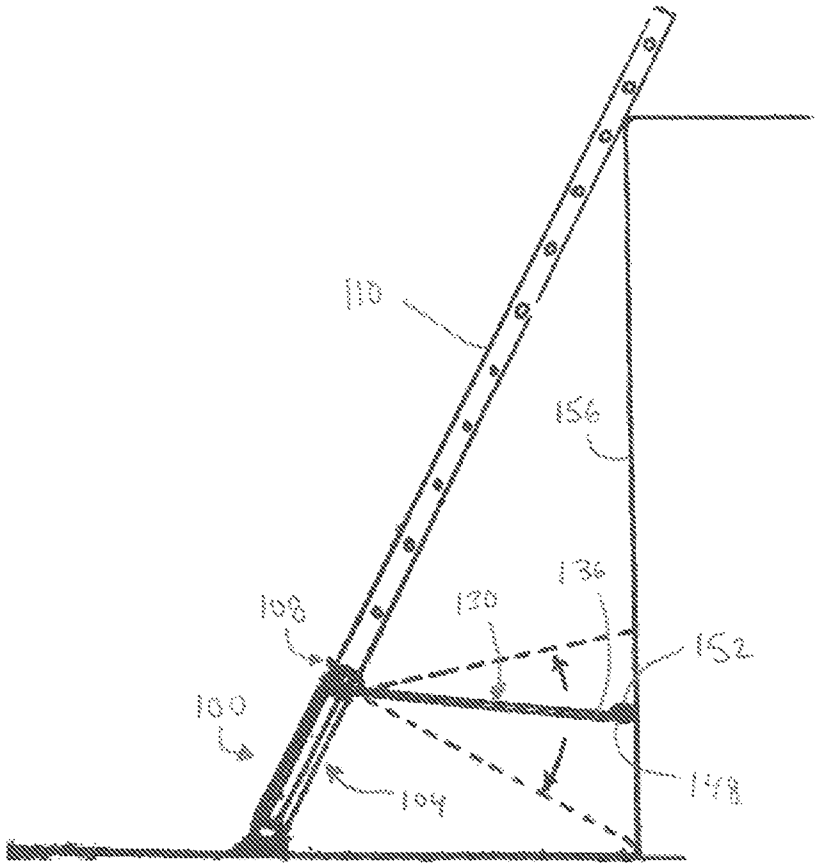
FIG. 5 is a schematic illustration of the ladder stabilizing apparatus of FIG. 1 anchoring a ladder to a building wall.

The belt second end 136 includes an environment anchor 144. The environment anchor 144 is securable to an external ladder support while the stabilizing belt 130 is retracted into tension in the belt extended position. The environment anchor 144 can have various configurations. In the example illustrated, the environment anchor 144 includes a hook 148. In some cases, as exemplified in FIG. 5, the hook 148 may latch with a corresponding eye hook 152 mounted on a building wall 156. This can restrict movement of the ladder 110 relative to the building wall 156 and thereby avert instances of ladder toppling. In other cases, the belt second end 136 is wrapped around an object (pipe, tree trunk, etc.) and then the hook 148 latched onto the stabilizing belt 130. In some examples, the environment anchor 144 includes a carabiner to facilitate attachment and detachment to the external ladder support.

Figure 7:
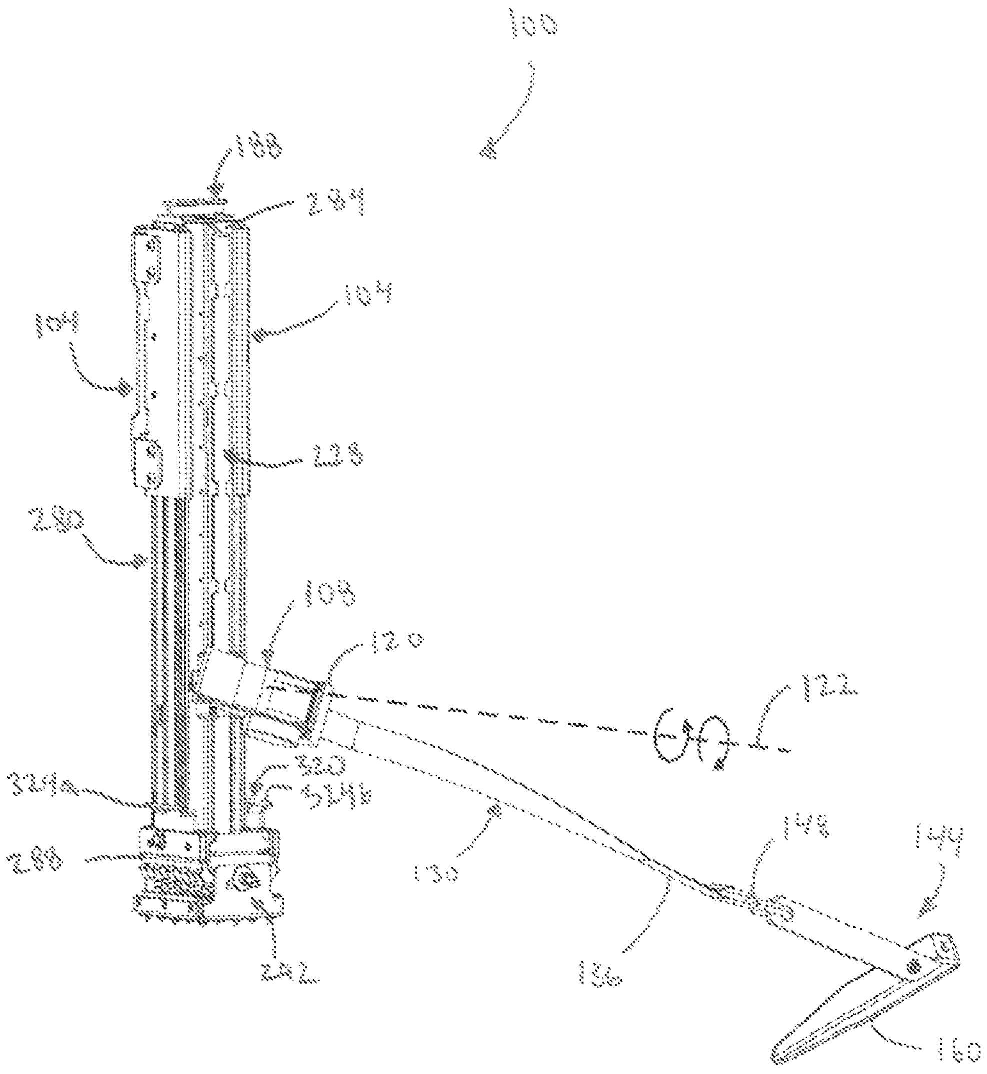
FIG. 7 is a front perspective view of the ladder stabilizing apparatus of FIG. 6 with its stabilizing belt moved to an extended position.
Figure 8:
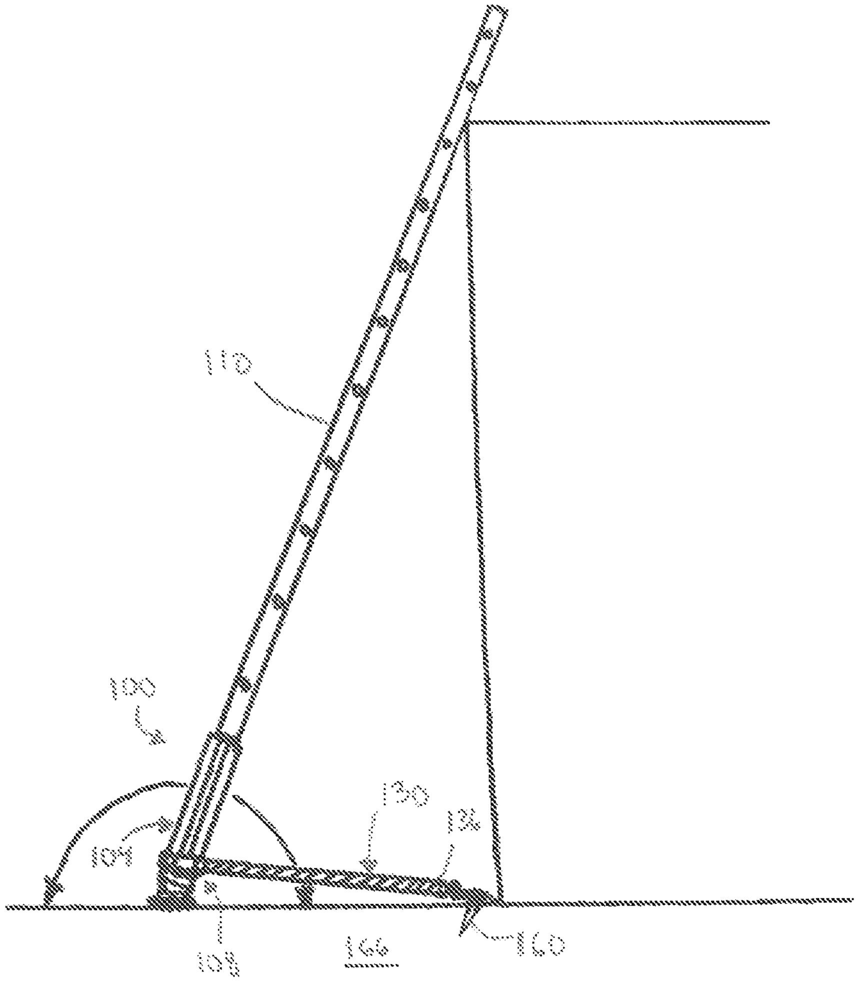
FIG. 8 is a schematic illustration of the ladder stabilizing apparatus of FIG. 6 anchoring a ladder to the ground.

Referring to FIG. 7, the environment anchor 144 may include a ground spike 160. In the example illustrated, the ground spike 160 is connected to the belt second end 136 via the hook 148. In other examples, the ground spike 160 can be connected directly to the belt second end 136 (i.e., without a hook). In use, as exemplified in FIG. 8, the ground spike 160 is embedded in the ground 166 to anchor the ladder. This can prevent the lower end of the ladder 110 from slipping relative to the ground. The extent to which the ground spike 160 is embedded into the ground depends at least in part on the hardness/softness of the ground. A user may choose to embed the ground spike 160 deeper into soft ground than hard ground to provide equivalent anchoring.

Referring to FIG. 2, a user can unwind the stabilizing belt 130 from the belt housing 120 by pulling the belt second end 136 (or environmental anchor 144) away from the belt housing 120. In some examples, the stabilizing belt 130 has a length between 0.5 meters and 6 meters. More preferably, the stabilizing belt 130 has a length between 2 meters and 4 meters. Belt lengths between 2 meters and 4 meters provide the environmental anchor 144 with sufficient reach for most, if not all, uses and keeps the size of the belt housing 120 relatively compact. Uses where a belt length over 6 meters is needed are sparse to non-existent. Belts of this length also require larger belt housings 120 and use more material than shorter belts. Still in some examples, the stabilizing belt 130 has a length greater than 6 meters.

Referring again to FIG. 3, the belt housing 120 can be connected to the rail interface 116 in any manner that allows the belt housing 120 to rotate relative to the rail interface 116 about a belt housing rotation axis 122. In the example illustrated, the belt housing 120 is rotatably connected to the rail interface 116 by a journal shaft 126 that passes through a shaft aperture 128 formed in the rail interface 116 and engages a journal bearing 124 fixed to the rail interface 116. In the example illustrated, the journal bearing 124 is sunken within a bearing opening formed in the rail interface 116. The journal bearing 124, in the example illustrated, defines the belt housing rotation axis 122. The journal bearing 124 may be, for example, a roller bearing or bushing.

The rotatability of the belt housing 120 about the belt housing rotation axis 122 may provide one or more advantages. One advantage is that the belt housing 120 and the unwound portion of the stabilizing belt 130 (i.e., the portion of the belt between the belt housing 120 and the environment anchor 144) can be pointed in the same direction. All else being equal, the stabilizing belt 130 loses anchoring strength the more it is twisted between the belt housing 120 and the environment anchor 144. Referring to FIG. 2, the belt housing 120 is rotated about the belt housing rotation axis 122 so that it points in the same direction as the unwound portion of the stabilizing belt 130. In use, the alignment of the belt housing 120 and the unwound portion of the stabilizing belt 130 reduces twisting in the stabilizing belt 130 that would otherwise weaken the anchoring strength provided by the stabilizing belt 130. Another advantage of the rotatability of the belt housing 120 about the belt housing rotation axis 122 is that it allows the belt housing 120 to be oriented in alignment with the direction in which the stabilizing belt 130 is unwound from the belt housing 120 so that the stabilizing belt 130 does not jam and fail to retract properly.

Figure 4:
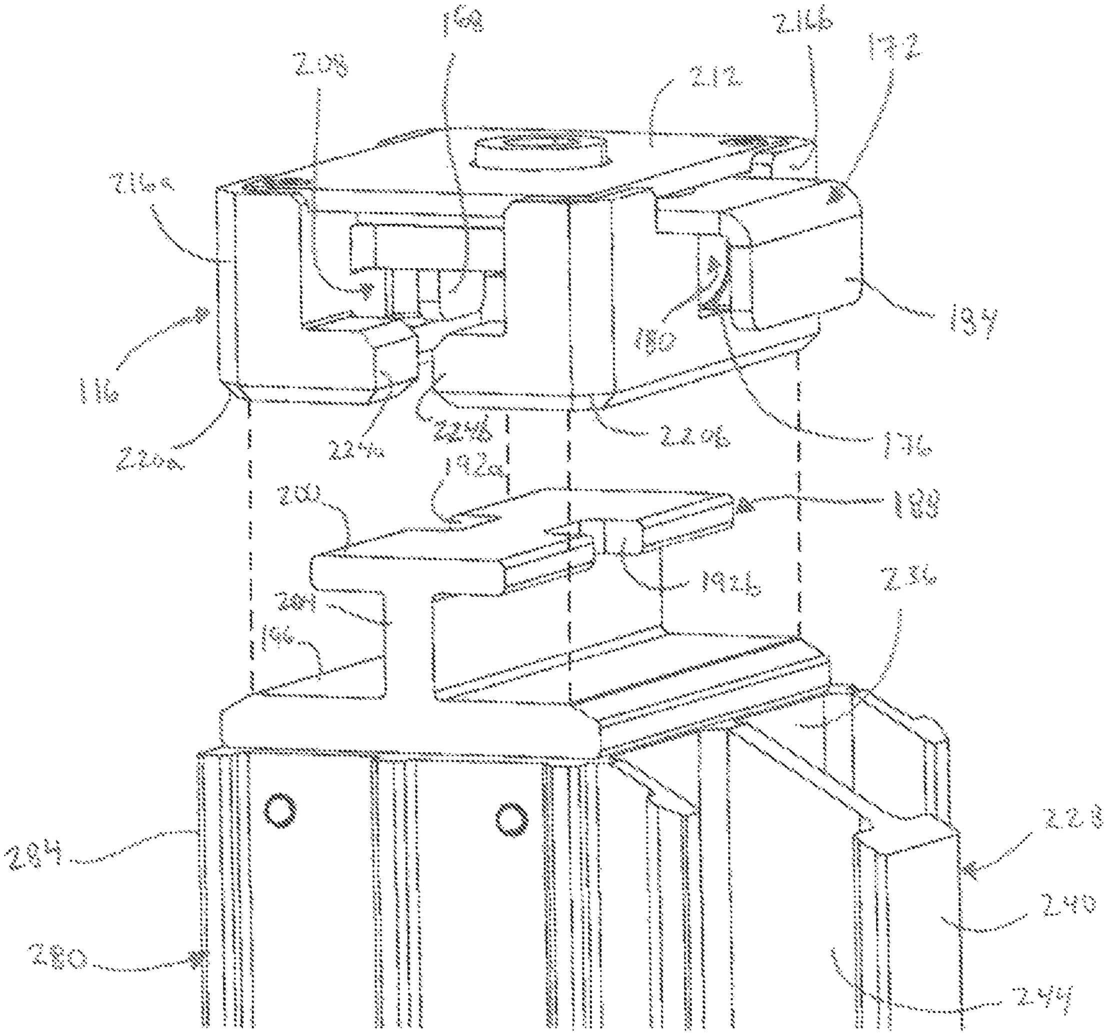
FIG. 4 is an exploded front perspective view of a portion of the ladder stabilizing apparatus of FIG. 1.

Referring to FIG. 4, in the example illustrated, the rail interface 116 is removably connectable to the rail mount 104 (FIG. 1) and includes a mounting lock 168 movable between an interface locked position and an interface unlocked position. In the interface locked position, the mounting lock 168 inhibits disconnecting the rail interface 116 from the rail mount 104. In the interface unlocked position, connecting the rail interface 116 to the rail mount 104 and disconnecting the rail interface 116 from the rail mount 104 are both uninhibited.

The rail interface 116 further includes a user-operated mounting lock release actuator 172 that when actuated moves the mounting lock 168 to the interface unlocked position. In the example illustrated, the mounting lock 168 extends perpendicularly from the mounting lock release actuator 172 (i.e., mounting lock 168 and the mounting lock release actuator 172 move as one).

In the example illustrated, a portion of the mounting lock release actuator 172 projects from the rail interface 116 to allow user interaction. The mounting lock release actuator 172 is actuated by pressing the portion projecting from the rail interface 116 inwardly (i.e., toward the rail interface 116). The mounting lock release actuator 172 is preferably biased to the non-actuated position (e.g., by a spring, band, or other suitable biasing member). In some examples, the mounting lock release actuator 172 is not biased to the non-actuated position. The mounting lock release actuator 172 can be actuated by a user when they wish to disconnect the belt assembly 108 from the rail mount 104.

In the example illustrated, the rail interface 116 includes a spring 176 partially received within a spring cavity 180. The spring 176 is sandwiched between an outboard end 184 of the mounting lock release actuator 172 and an internal surface of the spring cavity 180 (also illustrated in FIG. 12). The spring 176 is compressed as the mounting lock release actuator 172 is pressed inwardly by a user. When the user lets go of the mounting lock release actuator 172, the compression developed in the spring 176 is released, which urges the mounting lock release actuator 172 back to the non-actuated position. Since the mounting lock 168 and the mounting lock release actuator 172 move together, the spring 176 also acts to bias the mounting lock 168 to the interface locked position. In some examples, the mounting lock 168 is not biased to the interface locked position.

With reference to FIGS. 1 and 4, the ladder stabilizing apparatus 100 further includes a first mounting track 188 coupled to the rail mount 104. The belt assembly 108 is removably connectable to the first mounting track 188. Referring to FIG. 4, the first mounting track 188 includes at least one retention member 192 engageable with the mounting lock 168 when the mounting lock 168 is in the interface locked position.

In the example illustrated, the first mounting track 188 includes a first retaining member 192*a* and a second retaining member 192*b* in opposing relation to the first retaining member 192*a*. The first and second retaining members 192*a*, 192*b* allow the rail interface 116 to be connected to the first mounting track 188 in two orientations (the orientation shown in FIG. 4 and an orientation in which the rail interface 116 is spun 180 degrees relative to the orientation in FIG. 4).

The rail interface 116 is slidable along the first mounting track 188 when the mounting lock 168 is in the interface unlocked position. In the example illustrated, the mounting lock release actuator 172 can be actuated (e.g., pressed) by a user to move the mounting lock 168 to the interface unlocked position. When the mounting lock 168 is aligned with one of the retention members 192 of the first mounting track 188, the mounting lock 168 is movable to the interface locked position. In the example illustrated, compression developed in the spring 176 through actuation of the mounting lock release actuator 172 is released when the mounting lock 168 is aligned with the retention member 192. The released compression urges the mounting lock 168 to the interface locked position. In examples where the mounting lock 168 is not biased to the interface locked position, a user can pull the mounting lock release actuator 172 away from the rail interface 116 when the mounting lock 168 is aligned with the retention member 192 to move the mounting lock 168 to the interface locked position.

In the example illustrated, each retention member 192 is in the form of a notch dimensioned to mate with the mounting lock 168 when the mounting lock 168 is in the interface locked position. The mated engagement of the mounting lock 168 and the retention member 192 inhibits movement of the rail interface 116 along the first mounting track 188.

In the example illustrated, the rail interface 116 defines a channel 208 profiled to accommodate the first mounting track 188. The rail interface 116, in the example illustrated, includes a base plate 212, a first sidewall 216*a*, and a second sidewall 216*b* spaced apart from the first sidewall 216*a* along the base plate 212. The channel 208 is defined by the base plate 212 and the first and second sidewalls 216*a*, 216*b*. When the rail interface 116 is connected to the first mounting track 188, engagement between the channel 208 and the first mounting track 188 inhibits movement of the rail interface 116 other than along the first mounting track 188.

Referring still to FIG. 4, in the example illustrated, the first mounting track 188 includes a track inboard flange 196, a track outboard flange 200, and a track web 204 between the track inboard and outboard flanges 196, 200. The track outboard flange 200 includes the first and second retention members 192*a*, 192*b*. The channel 208 of the rail interface 116, in the example illustrated, is sized to receive the track outboard flange 200.

Each of the first and second sidewalls 216*a*, 216*b* extend from the base plate 212 to a sidewall distal end 220*a*, 220*b*. Each of the sidewall distal ends 220*a*, 220*b* have an inwardly facing catch 224*a*, 224*b* that engages an underside surface of the track outboard flange 200 when the rail interface 116 is connected to the first mounting track 188. This engagement inhibits movement of the rail interface 116 other than along the first mounting track 188.

Figure 6:
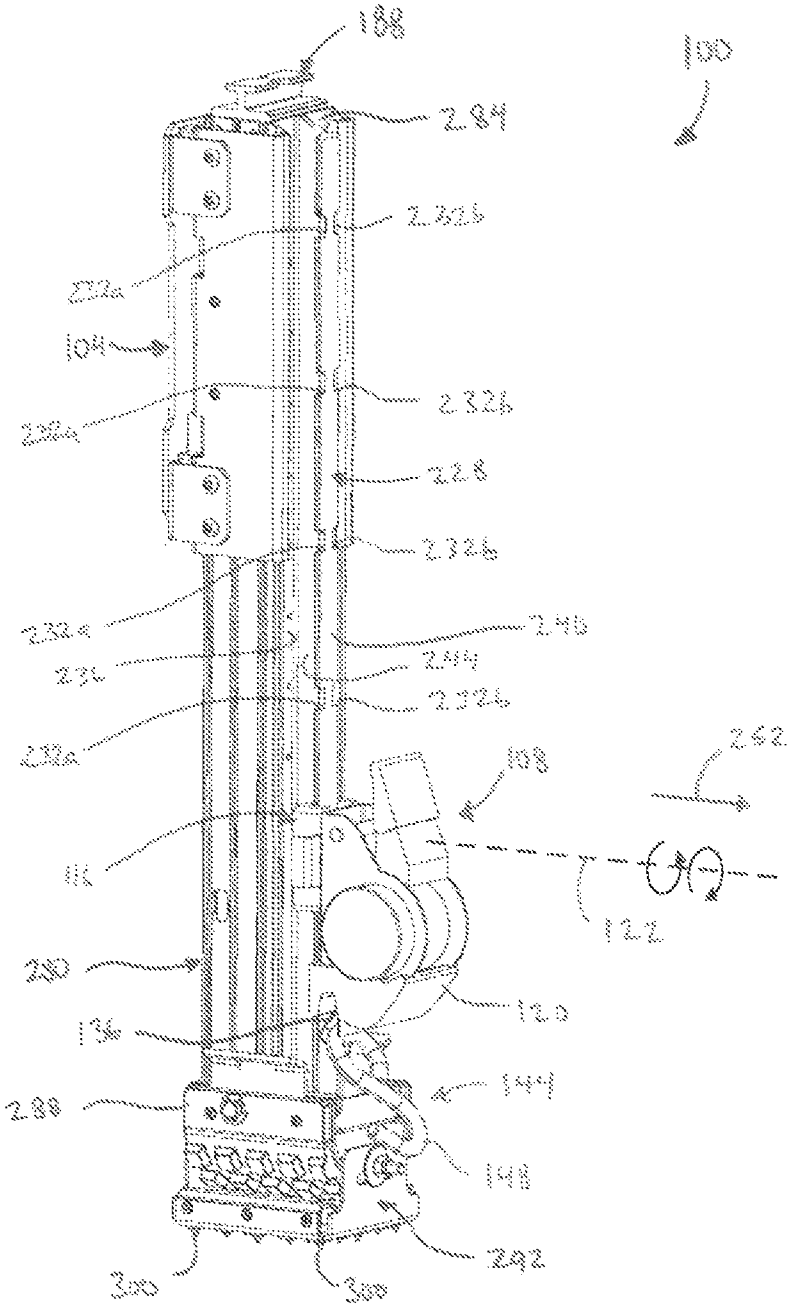
FIG. 6 is a front perspective view of the ladder stabilizing apparatus of FIG. 1 with its belt assembly moved to an alternate mounting location.

Referring again to FIG. 1, in the example illustrated, the ladder stabilizing apparatus 100 includes a second mounting track 228 having some similarity to the first mounting track 188. The second mounting track 228 is coupled to the rail mount 104. The belt assembly 108 is selectively connectable to either of the first and second mounting tracks 188 and 228. Turning to FIG. 6, the belt assembly 108 is shown connected to the second mounting track 228. Since the belt assembly 108 is connectable to either of the first and second mounting tracks 188, 228, the user can select a mounting location in which the stabilizing belt 130 can provide the preferred anchoring support on a case-by-case basis.

Like the first mounting track 188, the second mounting track 228 includes at least one retention member 232 engageable with the mounting lock 168 when the mounting lock 168 is in the interface locked position. In some examples, the ladder stabilizing apparatus 100 does not include the second mounting track 228. In some examples, the ladder stabilizing apparatus 100 includes the second mounting track 228 and does not include the first mounting track 188.

Referring to FIG. 1, in the example illustrated, the second mounting track 228 includes ten retention members 232, optionally arranged in five pairs of opposed first and second retention members 232*a*, 232*b*. Like the first and second retaining members 192*a*, 192*b*, the first and second retaining members 232*a*, 232*b* allow the rail interface 116 to be connected to the second mounting track 228 in two orientations. Each of the first retention members 232*a* is spaced apart from an adjacent one of the first retention members 232*a* along the second mounting track 228. Similarly, each of the second retention members 232*b* is spaced apart from an adjacent one of the second retention members 232*b* along the second mounting track 228.

Each of the retention members 232*a*, 232*b* define a respective mounting location and is engageable with the mounting lock 168 of the rail interface 116 (FIG. 4) when the mounting lock 168 is in the interface locked position at the respective mounting location. Referring to FIGS. 6 and 7, the belt assembly 108 is secured to a lowermost of the mounting locations.

In some examples, the second mounting track 228 includes an equal quantity of first and second retention members 232*a*, 232*b*. In other examples, the second mounting track 228 may include an unequal quantity of first and second retention members 232*a*, 232*b*. In the example illustrated, the quantity of first retention members 232*a* is equal to the quantity of second retention members 232*b*, and all of the retention members 232 are arranged in pairs. In some examples, some of the retention members 232 are arranged in pairs, and one or more others of the retention members 232 are not arranged in pairs, such as, for example, in cases where the quantity of first retention members 232*a* is unequal to the quantity of second retention members 232*b*.

Referring to FIG. 6, the second mounting track 228 includes a track inboard flange 236, a track outboard flange 240, and a track web 244 between the track inboard and outboard flanges 236, 240. The track outboard flange 240 includes the retention members 232. The channel 208 of the rail interface 116 (FIG. 4), in the example illustrated, is sized to receive the track outboard flange 240.

Referring to FIG. 1, when the belt assembly 108 is connected to the first mounting track 188, the belt housing rotation axis 122 is oriented in a first direction 248. Comparing FIG. 6 to FIG. 1, when the belt assembly 108 is connected to the second mounting track 228, the belt housing rotation axis 122 is oriented in a second direction 252 transverse to the first direction 248. As used herein, "transverse" means within 45 degrees of perpendicular. In the example illustrated, the second direction 252 (FIG. 6) extends generally perpendicular to the first direction 248 (FIG. 1).

As described above, one advantage of the belt housing 120 being rotatable about the belt housing rotation axis 122 is that the belt housing 120 and the unwound portion of the stabilizing belt 130 can be pointed in a similar direction. The alignment of the belt housing 120 and the unwound portion of the stabilizing belt 130 reduces twisting of the stabilizing belt 130 that would otherwise weaken the anchoring strength provided by the stabilizing belt 130. Since the belt assembly 108 is connectable to either of the first and second mounting tracks 188, 228, the user can select the mounting location that will minimize twisting of the stabilizing belt 130. For example, in cases where the user wishes to secure the environment anchor 144 to the ground, connecting the belt assembly 108 to the second mounting track 228 may limit twisting of the stabilizing belt 130 compared to connecting the belt assembly 108 to the first mounting track 188.

Referring again to FIG. 3, the belt assembly 108 further comprises a belt lock 256 movable between a belt locked position and a belt unlocked position. In the belt locked position, the belt lock 256 inhibits unwinding of the stabilizing belt 130 from the belt housing 120. In the belt unlocked position, unwinding of the stabilizing belt 130 from the belt housing 120 is uninhibited. In the example illustrated, the belt assembly 108 further comprises a user-operated belt lock release actuator 260 that when actuated moves the belt lock 256 from the belt locked position to the belt unlocked position.

To begin an anchoring process with the ladder stabilizing apparatus 100, a user actuates (e.g., depresses) the belt lock release actuator 260 and thereby moves the belt lock release actuator to the belt unlocked position. In the belt unlocked position, the stabilizing belt 130 can be unwound (i.e., extended) from the belt housing 120. The user can unwind the stabilizing belt 130 from the belt housing 120 by pulling the belt second end 136 (or environmental anchor 144) away from the belt housing 120. The user continues to unwind the stabilizing belt 130 until the environment anchor 144 can be secured to the desired external ladder support (e.g., wall, roof, ground, etc.). In the example illustrated, the belt lock 256 automatically moves to the belt locked position in response to a slight retraction of the stabilizing belt 130. Further extension of the stabilizing belt 130 is inhibited by the belt lock 256 in the belt locked position. In this way, the stabilizing belt 130 is retracted into tension in the belt extended position.

Referring to FIG. 1, in the example illustrated, the ladder stabilizing apparatus 100 further includes a retractable leg 280 translatably coupled to the rail mount 104. The retractable leg 280 extends between a leg upper end 284 and a leg lower end 288. In use, the retractable leg 280 is deployed to stabilize the ladder on uneven ground. The belt assembly 108 is removably connectable to the retractable leg 280. In the example illustrated, the first mounting track 188 is located at the leg upper end 284 and the second mounting track 228 extends between the leg upper and lower ends 284, 288. Referring to FIG. 4, the track inboard flange 196 of the first mounting track 188 is affixed to a top surface of the retractable leg 280 and the track inboard flange 236 of the second mounting track 228 is integrally formed with a sidewall of the retractable leg 280.

The retractable leg 280 is translatable relative to the rail mount 104 between a leg retracted position and a foot planted position. Referring to FIG. 1, the retractable leg 280 is illustrated in the leg retracted position. The retractable leg 280 may be kept in the leg retracted position when the ladder is positioned on even ground. The retractable leg 280 may also be kept in the leg retracted position when the ladder is not in use and/or being moved between work sites.

Figure 9:
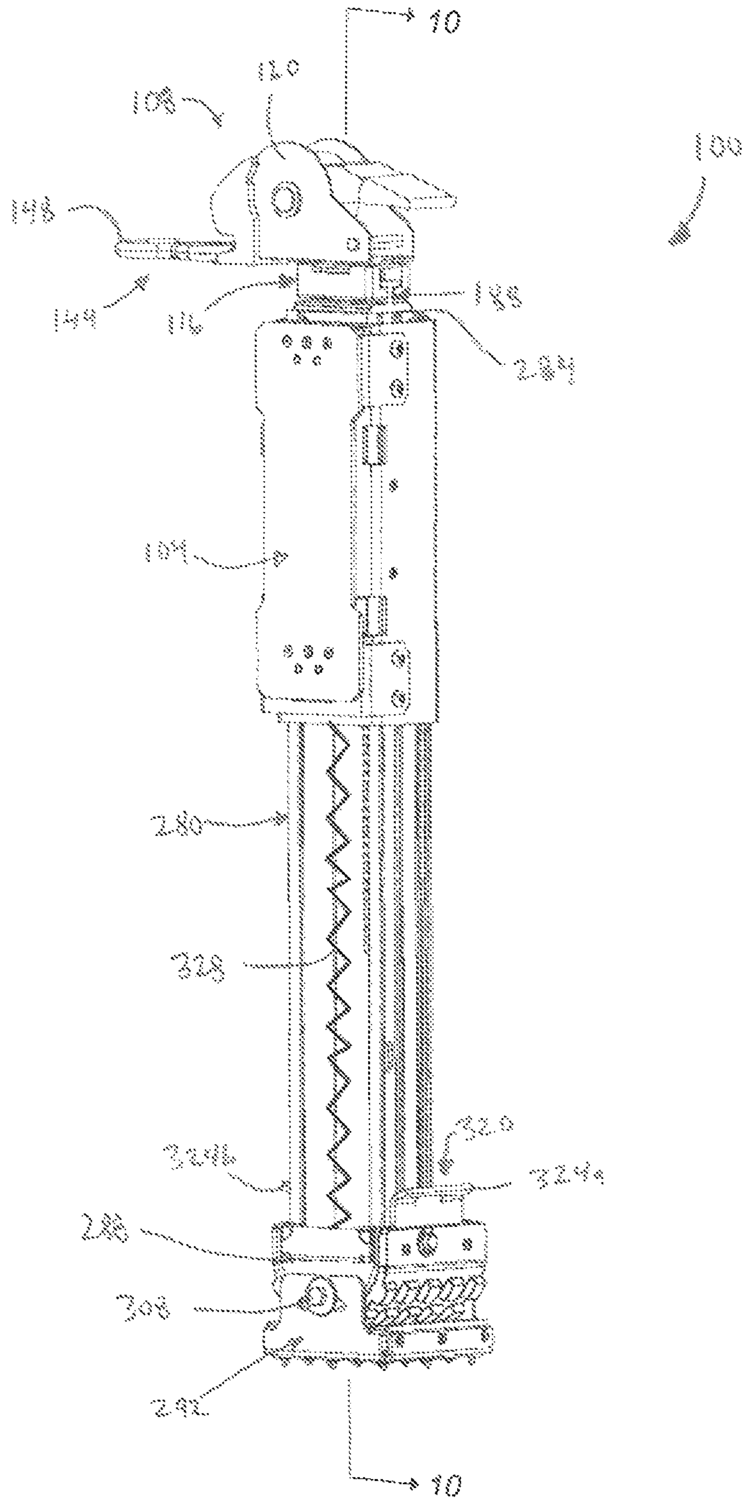
FIG. 9 is a rear perspective view of the ladder stabilizing apparatus of FIG. 1 with its retractable leg moved to a foot planted position.

Referring to FIGS. 2 and 9, the retractable leg 280 is illustrated in the foot planted position. The retractable leg 280 may be translated relative to the rail mount 104 toward the foot planted position until the leg lower end 288 contacts the ground. The retractable leg 280 need not be translated all the way to the foot planted position. Contact between the lower leg end 288 and the ground may occur at any point between, and including, the leg retracted and foot planted positions. The extent to which the retractable leg 280 is translated toward the foot planted position depends at least in part on the slope of the ground between ladder side rails.

In the example illustrated, the retractable leg 280 includes a foot adapter 292 detachably connected to the leg lower end 288. The detachable foot adapter 292, in the example illustrated, has a planar ground engagement surface 296 that includes a plurality of spikes 300. Compared to a ground engagement surface without spikes, the spikes 300 may increase friction with the ground and thereby help to further limit slipping of the ladder relative to the ground. In some examples, the planar ground engagement surface 296 does not have spikes. In some examples, the ladder stabilizing apparatus 100 does not include a detachable foot adapter.

Referring to FIGS. 1 and 2, the foot adapter 292 is rotatable about a foot rotation axis 304 relative to the retractable leg 280. Rotatability of the foot adapter 292 about the foot rotation axis 304 allows the ground engagement surface 296 to accommodate for unevenness (e.g., an incline) in the landing area of the leg lower end 288 and thereby provide a sturdier engagement with the ground compared to a non-rotatable footing. In some examples, the foot adapter 292 is not rotatable relative to the retractable leg 280.

The detachable foot adapter 292 can be attached to the leg lower end 288 in any manner that provides a firm connection and facilitates attachment and detachment that does not damage the retractable leg 280 or the foot adapter 292. In the example illustrated, a foot connector rod 308 extends from one end of the foot adapter 292, through an opening in the lower leg end 288, and is secured at the opposite end of the foot adapter 292 with a nut 310 (illustrated in FIG. 10). The foot rotation axis 304, in the example illustrated, is defined by the foot connector rod 308.

In some cases, the ladder stabilizing apparatus 100 is provided as a kit including a plurality of different foot adapters 292. Each foot adapter 292 may be adapted for use with a particular type of surface (e.g., concrete, gravel, grass, tile, hardwood, etc.) and/or a particular surface profile (e.g., flat, inclined, undulating, etc.). For example, a user can selectively connect one of the plurality of foot adapters 292 to the leg lower end 288 that is best suited for the particular surface on which the ladder is to be supported.

Figure 15:
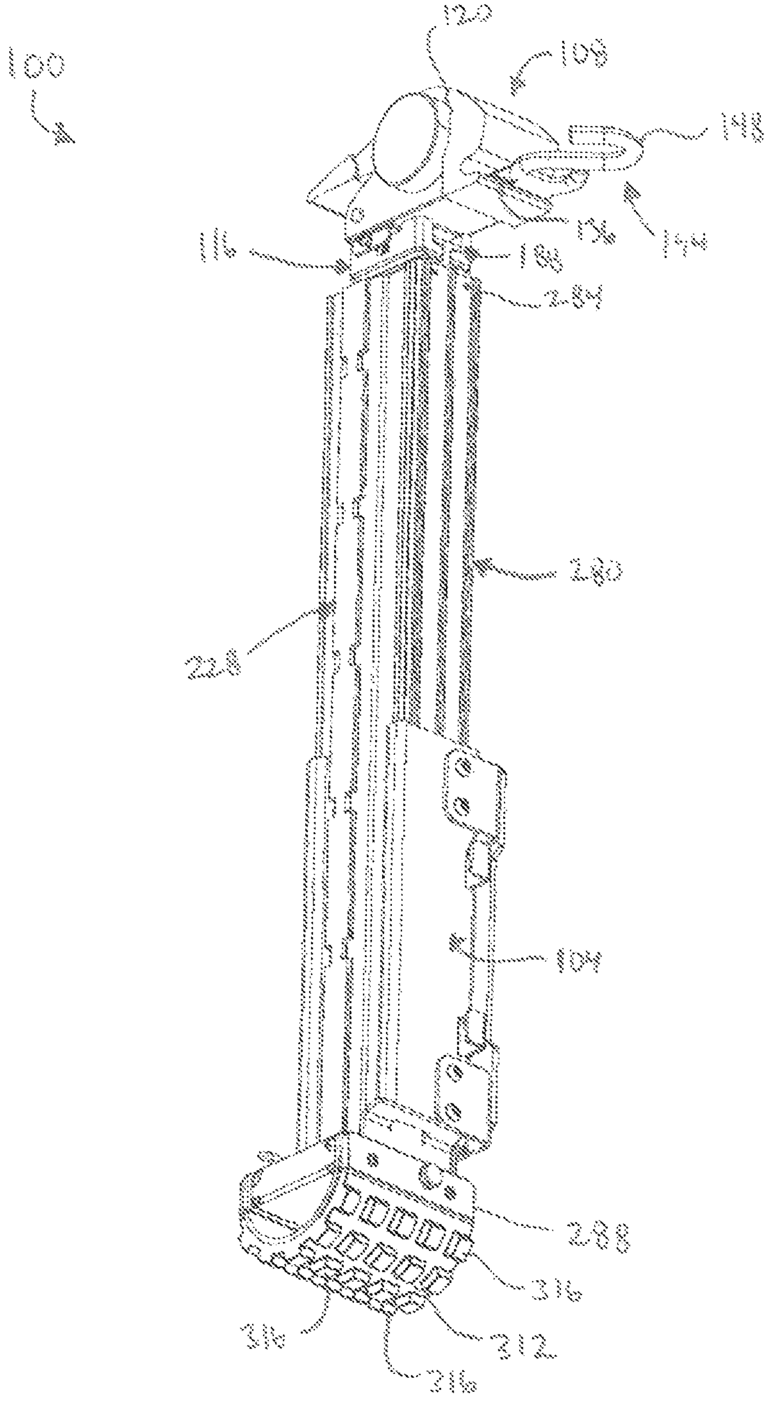
FIG. 15 is a side perspective view of the ladder stabilizing apparatus of FIG. 1 with its detachable foot adapter removed.

Referring to FIG. 15, the retractable leg 280 is illustrated without the detachable foot adapter 292 (FIGS. 1 and 2) connected to the leg lower end 288. The leg lower end 288, in the example illustrated, has a rounded ground engagement surface 312. The rounded ground engagement surface 312 can accommodate for unevenness in the landing area of the leg lower end 288 and thereby increase the amount of surface-to-surface contact with the ground compared to a leg lower end without a rounded ground engagement surface. The increased surface-to-surface contact may provide a sturdier engagement between the retractable leg 280 and the ground.

In the example illustrated, the rounded ground engagement surface 312 includes an array of cleats 316. The cleats 316, in the example illustrated are arranged in rows and columns. Compared to a ground engagement surface without cleats, the cleats 316 may increase friction with the ground and help to further limit slipping of the ladder relative to the ground. In cases where the lower end of the ladder is positioned on a drain or other grated surface, some of the cleats 316 may wedge into respective drain openings and further limit slipping of the ladder. In some examples, the rounded ground engagement surface 312 does not have cleats. In some examples, the leg lower end 288 has a planar ground engagement surface instead of a rounded ground engagement surface. This may provide greater surface contact on planar surfaces (e.g., tiled flooring) for greater overall frictional resistance to slipping.

Referring again to FIGS. 1 and 2, in the example illustrated, the retractable leg 280 further includes a foot pedal 320. Downward movement of the foot pedal 320 relative to the ladder side rail 112 translates the retractable leg 280 toward the foot planted position. In the example illustrated, the foot pedal 320 includes a pair of curved levers **324*a*, 324*b* that extend outwardly in opposing relation to each other from the retractable leg 280. For example, a user may translate the retractable leg 280 toward the foot planted position (i.e., lower the retractable leg 280) by putting one of their feet on either one of the levers 324*a*, 324*b* and moving that foot toward the ground. In some examples, the ladder stabilizing apparatus 100 does not include a foot pedal and the retractable leg 280** is translatable in another suitable manner.

Figure 10:
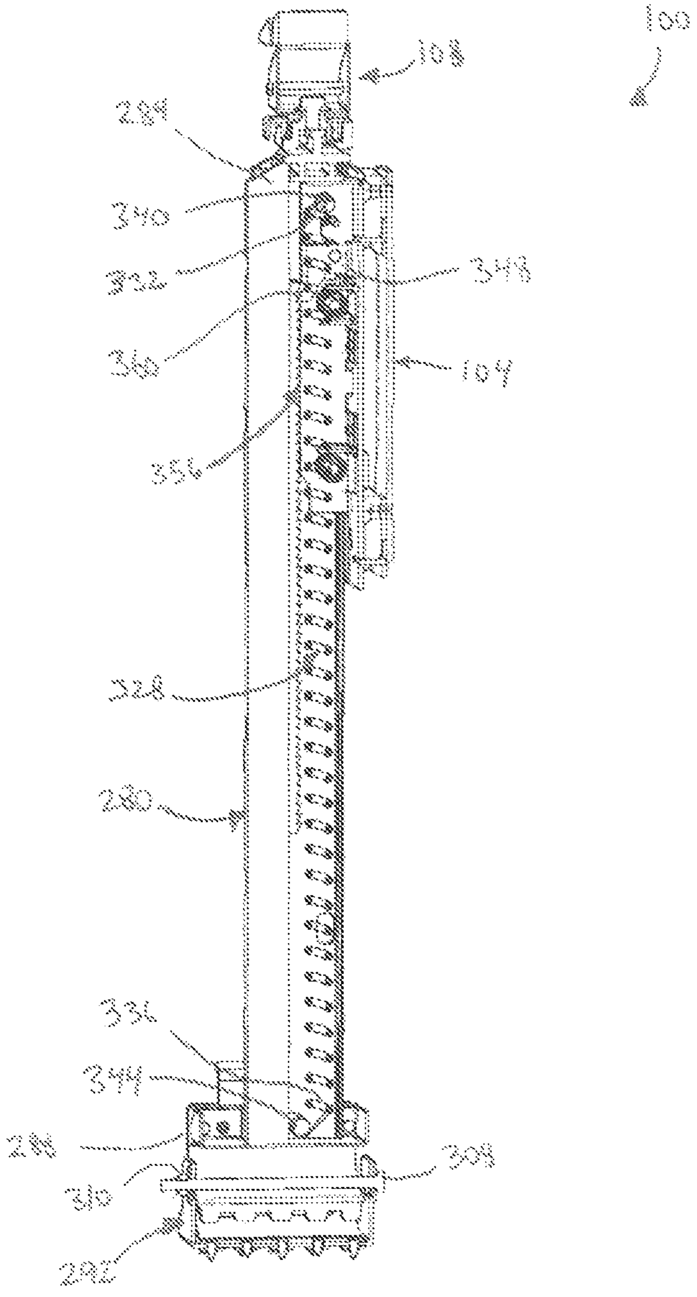
FIG. 10 is a cross-sectional view of the ladder stabilizing apparatus taken along line 10-10 of FIG. 9.

In the example illustrated, the retractable leg 280 is biased to the leg retracted position (FIG. 1). The retractable leg 280 may be biased to the leg retracted position in any suitable manner (e.g., by a spring or elastic band). Referring to FIGS. 9 and 10, in the example illustrated, the retractable leg 280 is biased to the leg retracted position by a leg spring 328. In some examples, the retractable leg 280 is not biased to the leg retracted position.

The leg spring 328, in the example illustrated, resists translation of the retractable leg 280 relative to the rail mount 104 toward the foot planted position. Referring to FIG. 10, the leg spring 328 has a spring upper end 332 and a spring lower end 336 opposite the spring upper end 332. In the example illustrated, the spring upper end 332 is coupled to the rail mount 104 by a rail mount connector rod 340 and the spring lower end 336 is coupled to the retractable leg 280 by a leg connector rod 344. As the retractable leg 280 translates relative to the rail mount 104 toward the foot planted position, the leg spring 328 extends (i.e., increases in length) between the connector rods 340 and 344. Tension develops in the leg spring 328 as it extends. The leg spring 328 urges the retractable leg 280 back to the leg retracted position (e.g., see FIG. 1) upon release of the tension developed in the leg spring 328.

The ladder stabilizing apparatus 100 may include a leg lock that is movable between a leg locked position and a leg unlocked position. In the leg locked position, the leg lock inhibits translation of the retractable leg 280 relative to the rail mount 104 towards the leg retracted position. In the leg unlocked position, translation of the retractable leg 280 is uninhibited (or at least the leg lock is not inhibiting the translation). The leg lock does not inhibit translation of the retractable leg 280 relative to the rail mount 104 towards the foot planted position regardless of whether the leg lock is in the leg locked or unlocked position. Various configurations of the leg lock are possible. In some examples, the ladder stabilizing apparatus 100 does not include a leg lock.

Figure 11:
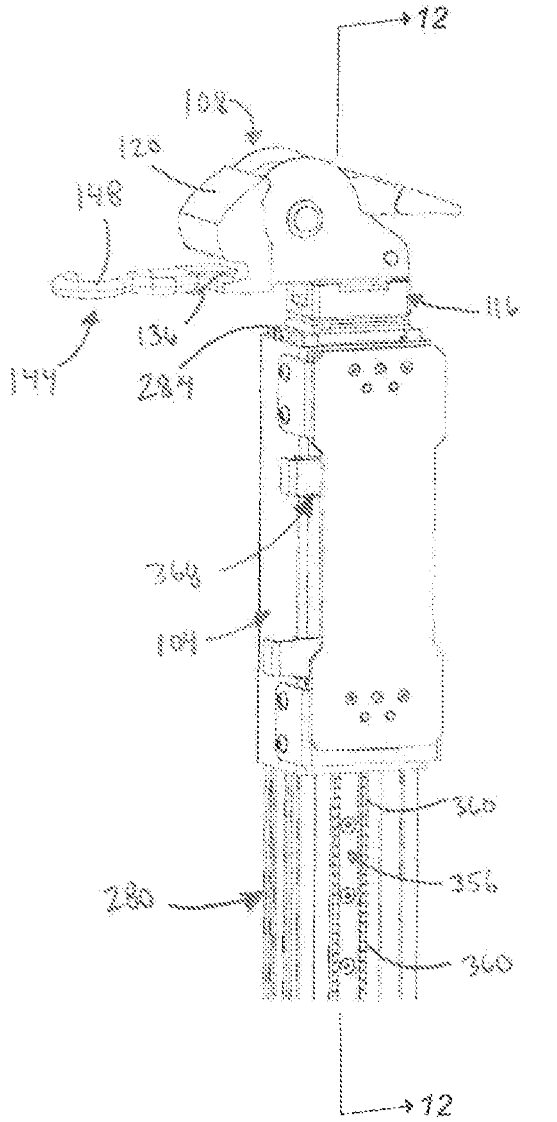
FIG. 11 is rear perspective view of a portion of the ladder stabilizing apparatus of FIG. 9 with its leg lock release actuator moved to an actuated position.
Figure 12:
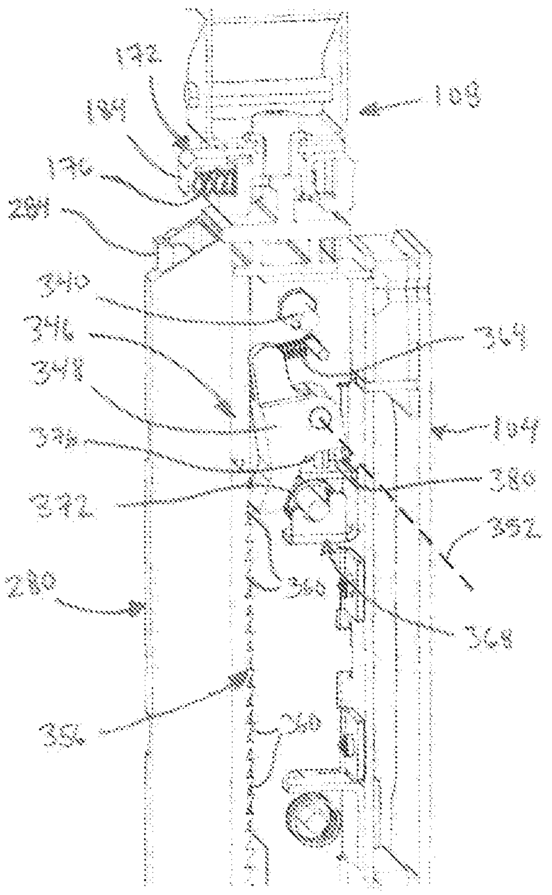
FIG. 12 is a cross-sectional view of a portion of the ladder stabilizing apparatus taken along line 12-12 of FIG. 11.

Reference is now made to FIGS. 11 and 12 to demonstrate operation of the leg lock included in the example illustrated. Referring to FIG. 12, the leg lock 346 includes a ratchet rack 356 and a pawl 348 pivotably connected to the rail mount 104 at a pawl pivot axis 352. The pawl 348 is positioned opposite the ratchet rack 356 which is provided on an interior wall of retractable leg 280. The ratchet rack 356 includes a plurality of pawl engagement teeth 360. The pawl 348 is pivotable about the pawl pivot axis 352 between a leg locked position (e.g., FIG. 10) and a leg unlocked position (e.g., Figure. 12). In the leg locked position, the pawl 348 mates with a corresponding one of the pawl engagement teeth 360. The mated engagement between the pawl 348 and the ratchet rack 356 inhibits translation of the retractable leg 280 relative to the rail mount 104 towards the leg retracted position. Translation of the retractable leg 280 relative to the rail mount 104 toward the foot planted position is uninhibited by the pawl 348 in the leg locked position. For clarity of illustration, the leg spring 328 is omitted from FIG. 12.

The leg lock 346 may be biased to the leg locked position. The leg lock 346 may be biased to the leg locked position in any suitable manner. In the example illustrated, the pawl 348 is biased to the leg locked position by a pawl spring 364. One end of the pawl spring 364 engages an upper end of the pawl 348 while the opposite end of the pawl spring 364 is connected to the rail mount 104. Through engagement with the upper end of the pawl 348, the pawl spring 364 continually urges the pawl 348 into engagement with the ratchet rack 356 whereby the leg lock 346 is held in the leg locked position. In some examples, the leg lock 346 is not biased to the leg locked position.

Referring to FIG. 11, in the example illustrated, the ladder stabilizing apparatus 100 includes a user-operated leg lock release actuator 368. A user can actuate (e.g., press) the leg lock release actuator 368 when they want to return the retractable leg 280 to the leg retracted position. In the example illustrated, a portion of the user-operated leg lock release actuator 368 projects from rail mount 104 to allow user interaction. The user-operated lock release actuator 368 is actuated by pressing the portion projecting from the rail mount 104 inwardly (i.e., toward the rail mount 104).

The leg lock release actuator 368 may be biased to the non-actuated position. The leg lock release actuator 368 may be biased to the non-actuated position in any suitable manner. Referring to FIG. 12, in the example illustrated, the leg lock release actuator 368 is biased to the non-actuated position by a spring 372. The leg lock release actuator 368, in the example illustrated, includes an upstanding cam 376 that slides along a camming surface 380 positioned on a rear surface of the pawl 348 as the leg lock release actuator 368 is actuated. Movement of the cam 376 along the camming surface 380 pivots the pawl 348 about the pawl pivot axis 352.

With reference to FIGS. 11 and 12, the leg lock release actuator 368 is illustrated in an actuated position (i.e., the portion of the leg lock release actuator 368 projecting from the rail mount 104 has been pressed inwardly). As the leg lock release actuator 368 is pressed inwardly, the cam 376 moves along the camming surface 380 thereby causing the pawl 348 to pivot about the pawl pivot axis 352 in a counterclockwise direction away from the ratchet rack 356.

Moving the pawl 348 from the leg locked position (FIG. 10) to the leg unlocked position (FIG. 12) disengages the pawl 348 from the ratchet rack 356. Referring to FIG. 12, the pawl 348 has pivoted counterclockwise by an extent sufficient to disengage the pawl 348 with the ratchet rack 356. In response to the pawl 348 moving from the leg locked position to the leg unlocked position, compression developed in the leg spring 328 (FIG. 10) is released and urges the retractable leg 280 back to the leg retracted position (FIG. 1).

Figure 13:
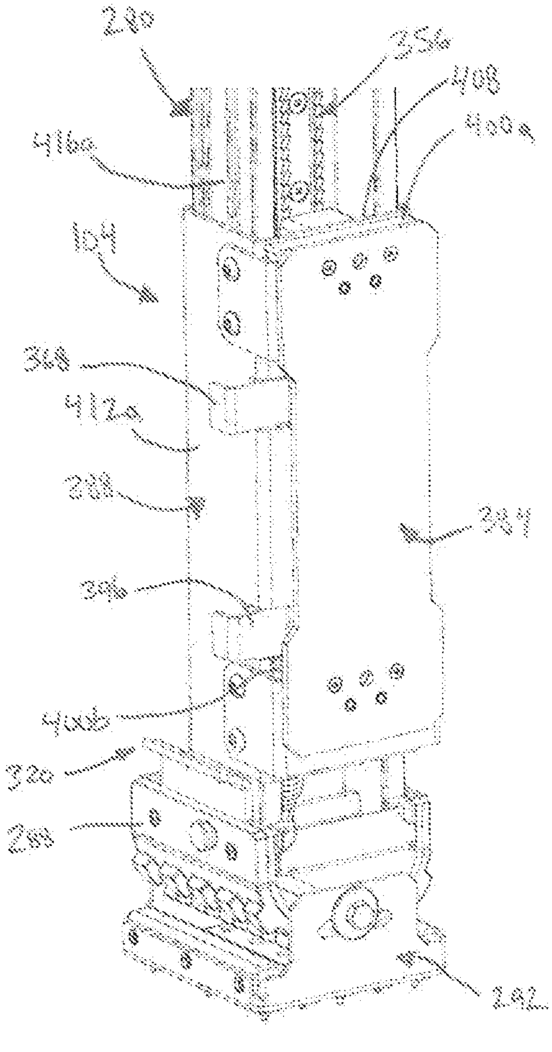
FIGS. 13 and 14 are rear and side perspective views of a portion of the ladder stabilizing apparatus of FIG. 1.
Figure 14:
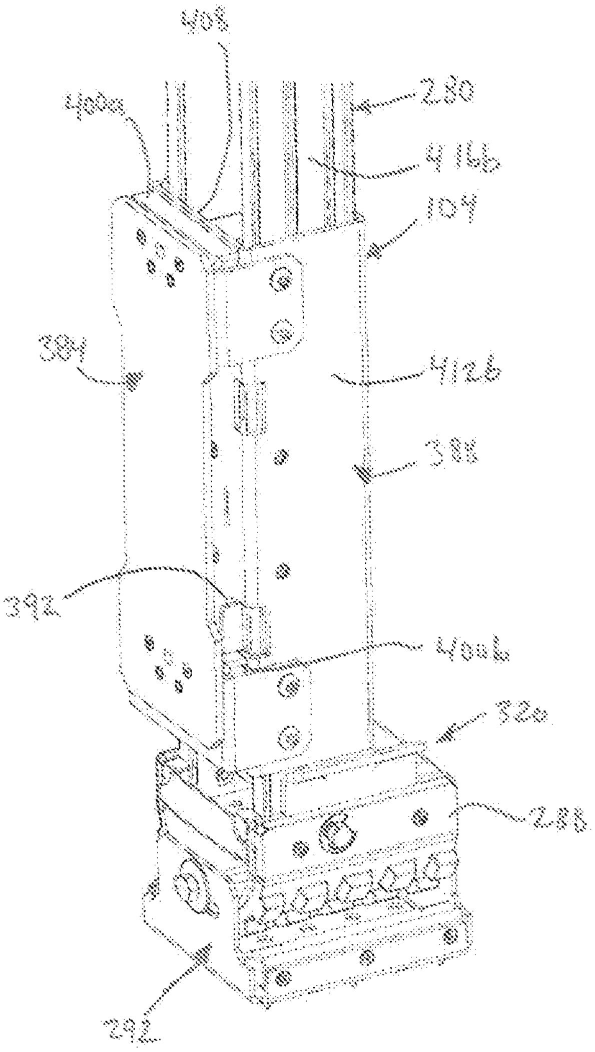

Reference is now made to FIGS. 13 and 14 to illustrate a quick release mechanism of the rail mount 104. In the example illustrated, the quick release mechanism includes a ladder connector 384 attachable to a ladder side rail, a leg connector 388 rigidly attachable to the ladder connector 384, a connector lock 392, and a quick release actuator 396.

In the example illustrated, the ladder connector 384 includes upper and lower male members 400*a*, 400*b* and the leg connector 388 includes complementarily shaped upper and lower female members (hidden from view in FIGS. 13 and 14). In other examples, a different number of male and female members may be provided (e.g., one of each, three of each, etc.). To rigidly attach the ladder connector 384 and the leg connector 388, the upper and lower male members 400*a*, 400*b* of the ladder connector 384 are slid into mated engagement with respective ones of the upper and lower female members of the leg connector 388.

The leg connector 388 can have various configurations and attach to the retractable leg 280 in various ways. In the example illustrated, the leg connector 388 includes an end wall 408 and a pair of sidewalls 412*a*, 412*b* that extend from opposite edges of the end wall 408. The end wall 408, in the example illustrated, includes the upper and lower female members. The sidewalls 412*a*, 412*b* include respective apertures to allow the leg lock release actuator 368 and the quick release actuator 396 to extend therethrough. Each of the sidewalls 412*a*, 412*b* of the leg connector 388 slidably engage a respective sidewall track 416*a*, 416*b* of the retractable leg 280.

Referring to FIG. 13, in the example illustrated, a portion of the quick release actuator 396 projects from the rail mount 104 to facilitate user interaction. The quick release actuator 396 is actuated by pressing the portion projecting from the rail mount 104 inwardly (i.e., toward the rail mount 104). The quick release actuator 396 is preferably biased to the non-actuated position (e.g., by a spring, band, or other suitable biasing member). In some examples, the quick release actuator 396 is not biased to the non-actuated position.

With reference to FIGS. 13 and 14, in the example illustrated, the connector lock 392 is in the form of a flange that extends perpendicularly from an end of the quick release actuator 396. Since the quick release actuator 396 and the connector lock 392 move together, actuation of the quick release actuator 396 actuates the connector lock 392.

When the male members 400*a*, 400*b* of the ladder connector 384 are in mated engagement with respective female members of the leg connector 388 and the connector lock 392 is in the connector locked position, the connector lock 392 inhibits separation of the ladder connector 384 from the leg connector 388. Referring to FIG. 14, the connector lock 392 overlies a portion of an upper end of the lower male member 400*b* when in the connector locked position. In such a position, the connector lock 392 obstructs removal of the lower male member 400*b* from the corresponding female member and thereby prevents disengagement of the ladder connector 384 and the leg connector 388.

When actuated, the quick release actuator 396 moves the connector lock 392 to the connector unlocked position. A user can actuate (e.g., press) the quick release actuator 396 when they want to separate the leg connector 388 from the ladder connector 384. For example, the user may choose to separate the leg connector 388 from the ladder connector 384 when no ladder stabilization is needed or when the ladder is being placed in storage. When the connector lock 392 is in the connector unlocked position, removal of the male members 400*a*, 400*b* of the ladder connector 384 from corresponding female members of the leg connector 388 is uninhibited. The connector lock 392 does not overlie the upper end of the lower male member 400*b* when the connector lock 392 is in the connector unlocked position.

Figure 16:
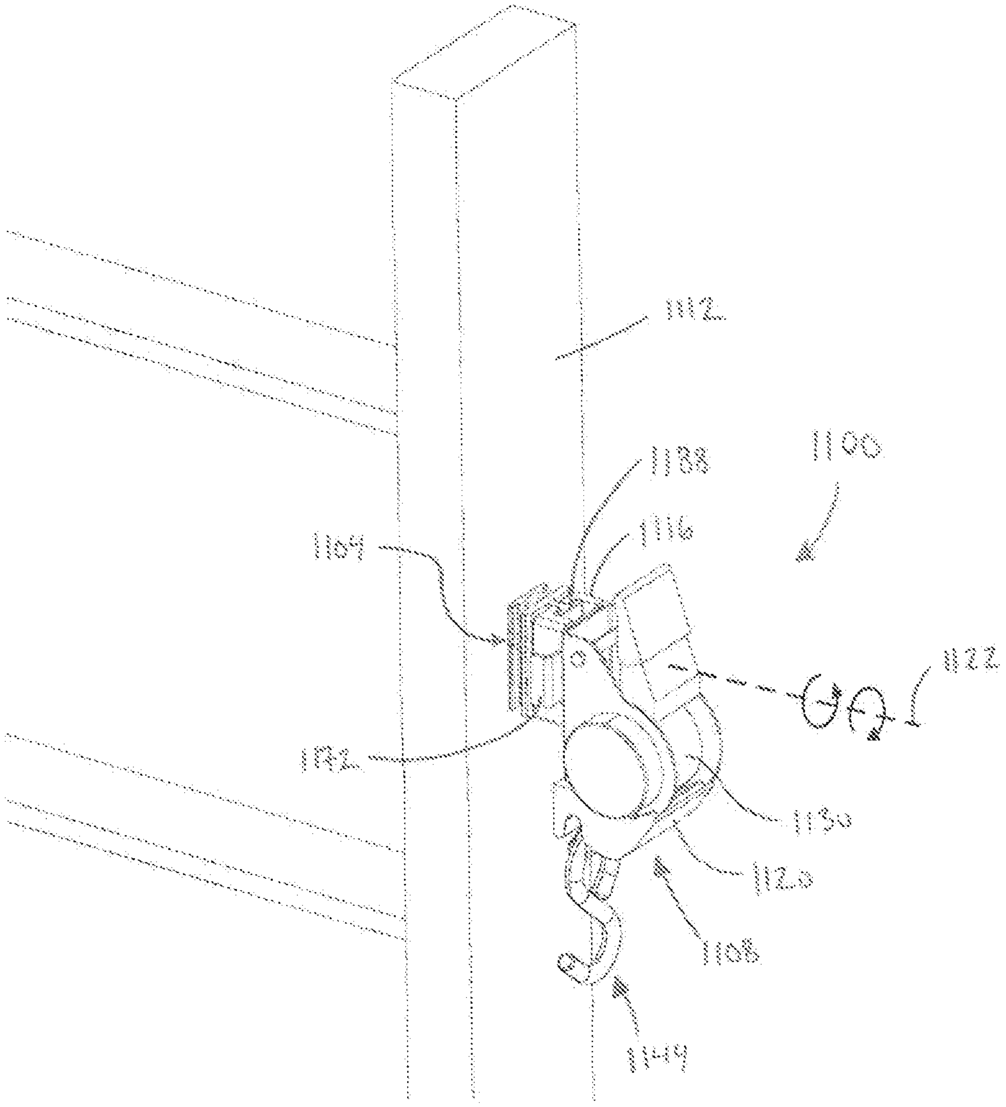
FIG. 16 is a front perspective view of another ladder stabilizing apparatus which includes the belt assembly and mounting track of the ladder stabilizing apparatus of FIG. 1 connected directly to a ladder side rail.

Referring to FIG. 16, another example of a ladder stabilizing apparatus 1100 in accordance with aspects of the present teaching has some similarity to the ladder stabilizing apparatus 100, with like features identified by like reference characters, incremented by 1000.

The ladder stabilizing apparatus 1100 includes a rail mount 1104 and an auto-retracting belt assembly 1108 connectable to the rail mount 1104. The belt assembly 1108 includes a rail interface 1116 connectable to the rail mount 1104, a belt housing 1120 rotatably connected to the rail interface 1116, and a stabilizing belt 1130 connected at one end to the belt housing 1120 and the other to an environment anchor 1144. The belt housing 1120 is rotatable relative to the rail interface 1116 about a belt housing rotation axis 1122. As with the stabilizing belt 130, the stabilizing belt 1130 is movable between a belt retracted position, in which the stabilizing belt 1130 is substantially wound within the belt housing 1120, and a belt extended position, in which the stabilizing belt 1130 is at least partially unwound from the belt housing 1120. The environment anchor 1144 is securable to an external ladder support (e.g., a wall, a roof, a tree, the ground, etc.) while the stabilizing belt 1130 is retracted into tension in the belt extended position.

In the example illustrated, the rail mount 1104 is attached to a ladder side rail 1112. The rail mount 1104 is attachable to the ladder side rail 1112 in any manner that provides a rigid connection between the rail mount 1104 and the ladder side rail 1112. In the example illustrated, the rail mount 1104 includes one or more mounting apertures through which fasteners are passed to attach the rail mount 1104 to the ladder side rail 1112.

The rail mount 1104 includes a mounting track 1188. The rail interface 1116 is connectable to the mounting track 1188 and includes a mounting lock (not illustrated, but similar to the mounting lock 168 of FIG. 4). The mounting lock is movable between an interface locked position, in which the mounting lock inhibits disconnecting the rail interface 1116 from the mounting track 1188, and an interface unlocked position, in which both connecting the rail interface 1116 to the mounting track 1188 and disconnecting the rail interface 1116 from the mounting track 1188 are uninhibited. The rail interface 1116 further includes a user-operated mounting lock release actuator 1172 that when actuated moves the mounting lock to the interface unlocked position.

The mounting track 1188 includes at least one retention member (not illustrated, but similar to the retention members 192*a*, 192*b* of FIG. 4). The retention member of the mounting track 1188 is engageable with the mounting lock of the rail interface 1116 when the mounting lock is in the interface locked position. The engagement between the mounting lock and the retention member inhibits movement of the rail interface 1116 along the mounting track 1188.

Figure 17:
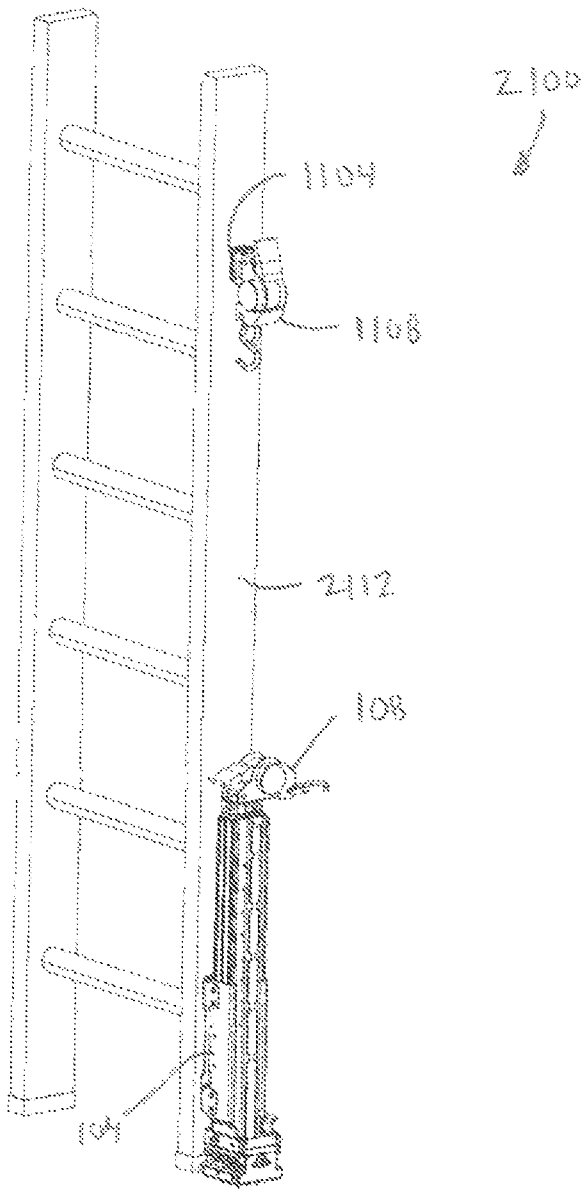
FIG. 17 is a front perspective view of another ladder stabilizing apparatus which includes features of the ladder stabilizing apparatuses of FIGS. 1 and 16.

Referring to FIG. 17, another example of a ladder stabilizing apparatus 2100 in accordance with aspects of the present teaching includes a plurality of rail mounts and a plurality of auto-retracting belt assemblies. Each of the belt assemblies is connectable to a corresponding one of the rail mounts. In the example illustrated, the plurality of rail mounts includes the rail mount 104 and the rail mount 1104. The rail mount 104 is connected proximate a lower end of the ladder side rail 2112. The rail mount 1104 is connected proximate an upper end of the ladder side rail 2112. In the example illustrated, the belt assembly 108 is connected to the rail mount 104 and the belt assembly 1108 is connected to the rail mount 1104. In this arrangement, stabilizing belts of respective belt assemblies 108, 1108 can be used to anchor both the upper and lower end of the ladder and thereby help to prevent both ladder toppling and slipping. In some examples, the ladder stabilizing apparatus may include a rail mount and corresponding belt assembly on each ladder side rail.

While the above description provides examples of one or more apparatuses or methods, it will be appreciated that other apparatuses or methods may be within the scope of the accompanying claims.

Items

Item 1: A ladder stabilizing apparatus comprising:
a rail mount attachable to a ladder side rail; and
an auto-retracting belt assembly comprising:
a rail interface connectable to the rail mount;
a belt housing rotatable relative to the rail interface about a belt housing rotation axis; and
a stabilizing belt extending from a belt first end to a belt second end, the belt first end being connected to the belt housing, the stabilizing belt movable between
a belt retracted position, in which the stabilizing belt is substantially wound within the belt housing, and
a belt extended position, in which the stabilizing belt is at least partially unwound from the belt housing,
wherein the stabilizing belt is biased to the belt retracted position, and the belt second end includes an environment anchor.

Item 2: The ladder stabilizing apparatus of any preceding item, wherein the environment anchor is securable to an external ladder support while the stabilizing belt is retracted into tension in the extended position.

Item 3: The ladder stabilizing apparatus of any preceding item, wherein the rail interface is removably connectable to the rail mount and includes a mounting lock movable between an interface locked position, in which the mounting lock inhibits disconnecting the rail interface from the rail mount, and an interface unlocked position, in which both connecting the rail interface to the rail mount and disconnecting the rail interface from the rail mount are uninhibited.

Item 4: The ladder stabilizing apparatus of any preceding item, wherein the mounting lock is biased to the interface locked position, and the rail interface further comprises a user-operated mounting lock release actuator that when actuated moves the mounting lock to the interface unlocked position.

Item 5: The ladder stabilizing apparatus of any preceding item, wherein the rail mount comprises a first mounting track including at least one retention member engageable with the mounting lock when the mounting lock is in the interface locked position.

Item 6: The ladder stabilizing apparatus of any preceding item, further comprising a first mounting track coupled to the rail mount, the belt assembly being removably connectable to the first mounting track, the first mounting track including at least one retention member engageable with the mounting lock when the mounting lock is in the interface locked position.

Item 7: The ladder stabilizing apparatus of any preceding item, wherein the first mounting track includes a first track outboard flange, a first track inboard flange, and a first track web between the first track inboard and outboard flanges, the first track outboard flange including the at least one retention member.

Item 8: The ladder stabilizing apparatus of any preceding item, wherein each of the at least one retention member comprises a notch dimensioned to mate with the mounting lock when the mounting lock is in the interface locked position.

Item 9: The ladder stabilizing apparatus of any preceding item, wherein the at least one retention member comprises a plurality of retention members, each of the plurality of retention members defining a respective mounting location and engageable with the mounting lock when the mounting lock is in the interface locked position at the respective mounting location.

Item 10: The ladder stabilizing apparatus of any preceding item, wherein each of the plurality of retention members is spaced apart from an adjacent one of the plurality of retention members along the first mounting track.

Item 11: The ladder stabilizing apparatus of any preceding item, wherein the rail interface is slidable along the first mounting track when the mounting lock is in the interface unlocked position.

Item 12: The ladder stabilizing apparatus of any preceding item, wherein the rail interface defines a channel profiled to accommodate the first mounting track.

Item 13: The ladder stabilizing apparatus of any preceding item, wherein the rail interface comprises a base plate, a first sidewall, and a second sidewall spaced apart from the first sidewall along the base plate, and the channel is defined at least in part by the base plate, the first sidewall and the second sidewall.

Item 14: The ladder stabilizing apparatus of any preceding item, wherein each of the first and second sidewalls extend from the base plate to a sidewall distal end, each of the sidewall distal ends having an inwardly facing catch that engages an underside surface of the mount outboard flange when the mounting lock is in the interface locked position.

Item 15: The ladder stabilizing apparatus of any preceding item, wherein, when the rail interface is mounted to the first mounting track, engagement between the channel and the first mounting track inhibits movement of the rail interface other than along the first mounting track.

Item 16: The ladder stabilizing apparatus of any preceding item, further comprising a second mounting track coupled to the rail mount, the belt assembly being removably connectable to the second mounting track, the second mounting track including at least one retention member engageable with the mounting lock when the mounting lock is in the interface locked position.

Item 17: The ladder stabilizing apparatus of any preceding item, wherein the second mounting track includes a second track outboard flange, a second track inboard flange, and a second track web between the second track inboard and outboard flanges, the second track flange including the at least one retention member of the second mounting track.

Item 18: The ladder stabilizing apparatus of any preceding item, wherein, when the belt assembly is connected to the first mounting track, the belt housing rotation axis is oriented in a first direction, and when the belt assembly is connected to the second mounting track, the belt housing rotation axis is oriented in a second direction transverse to the first direction.

Item 19: The ladder stabilizing apparatus of any preceding item, wherein the environment anchor comprises a hook.

Item 20: The ladder stabilizing apparatus of any preceding item, wherein the environment anchor comprises a ground spike.

Item 21: The ladder stabilizing apparatus of any preceding item, wherein the belt assembly further comprises a belt lock movable between a belt locked position, in which the belt lock inhibits unwinding of the stabilizing belt from the belt housing, and a belt unlocked position, in which unwinding of the stabilizing belt from the belt housing is uninhibited.

Item 22: The ladder stabilizing apparatus of any preceding item, wherein the belt assembly further comprises a user-operated belt lock release actuator that when actuated moves the belt lock from the belt locked position to the belt unlocked position.

Item 23: The ladder stabilizing apparatus of any preceding item, further comprising a retractable leg translatably coupled to the rail mount and translatable relative to the rail mount between a leg retracted position and a foot planted position, the retractable leg extending between a leg upper end and a leg lower foot, wherein the belt assembly is removably connectable to the retractable leg.

Item 24: The ladder stabilizing apparatus of any preceding item further comprising a leg lock movable between a leg locked position, in which the leg lock inhibits a translation of the retractable leg relative to the rail mount towards the leg retracted position, and a leg unlocked position in which the translation of the retractable leg is uninhibited.

Item 25: The ladder stabilizing apparatus of any preceding item, wherein the leg lock is biased to the leg locked position.

Item 26: The ladder stabilizing apparatus of any preceding item, further comprising a user-operated leg lock release actuator that when actuated moves the leg lock to the leg unlocked position.

Item 27: The ladder stabilizing apparatus of any preceding item, wherein the retractable leg is biased to the leg retracted position.

Item 28: The ladder stabilizing apparatus of any preceding item, wherein the retractable leg comprises a foot pedal, wherein downward movement of the foot pedal comprises the retractable leg translating relative to the rail mount towards the foot planted position.

Item 29: The ladder stabilizing apparatus of any preceding item, comprising: a plurality of rail mounts including the rail mount; and a plurality of auto-retracting belt assemblies including the auto-retracting belt assembly, wherein each of the belt assemblies is removably connectable to a corresponding one of the rail mounts.

Item 30: A ladder comprising the ladder side rail and the ladder stabilizing apparatus of any preceding item.

The invention claimed is:

1. A ladder stabilizing apparatus comprising:

a rail mount attachable to a ladder side rail extending in a first direction, the rail mount comprising a first mounting track and a second mounting track; and an auto-retracting belt assembly comprising:

a rail interface selectively removably connectable to the first and second mounting tracks;

a belt housing rotatable relative to the rail interface about a belt housing rotation axis; and a stabilizing belt extending from a belt first end to a belt second end, the belt first end being connected to the belt housing, the stabilizing belt movable between a belt retracted position, in which the stabilizing belt is substantially wound within the belt housing, and a belt extended position, in which the stabilizing belt is at least partially unwound from the belt housing, wherein the stabilizing belt is biased to the belt retracted position, and the belt second end includes an environment anchor, wherein the belt housing rotation axis extends in the first direction, parallel to the second track, when the rail interface is connected to the first mounting track, and wherein the belt housing rotation axis extends transversely to the first direction when the rail interface is connected to the second mounting track.

2. The ladder stabilizing apparatus of claim 1, wherein the environment anchor is securable to an external ladder support while the stabilizing belt is retracted into tension in the extended position.

3. The ladder stabilizing apparatus of claim 1, wherein the rail interface includes a mounting lock movable between an interface locked position, in which the mounting lock inhibits disconnecting the rail interface from the rail mount, and an interface unlocked position, in which both connecting the rail interface to the rail mount and disconnecting the rail interface from the rail mount are uninhibited.

4. The ladder stabilizing apparatus of claim 3, wherein the mounting lock is biased to the interface locked position, and the rail interface further comprises a user-operated mounting lock release actuator that when actuated moves the mounting lock to the interface unlocked position.

5. The ladder stabilizing apparatus of claim 3, wherein the first mounting track includes at least one retention member engageable with the mounting lock when the mounting lock is in the interface locked position.

6. The ladder stabilizing apparatus of claim 5, wherein each of the at least one retention member comprises a notch dimensioned to mate with the mounting lock when the mounting lock is in the interface locked position.

7. The ladder stabilizing apparatus of claim 5, wherein the at least one retention member comprises a plurality of retention members, each of the plurality of retention members defining a respective mounting location and engageable with the mounting lock when the mounting lock is in the interface locked position at the respective mounting location.

8. The ladder stabilizing apparatus of claim 7, wherein each of the plurality of retention members is spaced apart from an adjacent one of the plurality of retention members along the first mounting track.

9. The ladder stabilizing apparatus of claim 5, wherein the rail interface is slidable along the first mounting track when the mounting lock is in the interface unlocked position.

10. The ladder stabilizing apparatus of claim 9, wherein the rail interface defines a channel profiled to accommodate the first mounting track.

11. The ladder stabilizing apparatus of claim 10, wherein, when the rail interface is mounted to the first mounting track, engagement between the channel and the first mounting track inhibits movement of the rail interface other than along the first mounting track.

12. The ladder stabilizing apparatus of claim 3, wherein the second mounting track includes at least one retention member engageable with the mounting lock when the mounting lock is in the interface locked position.

13. The ladder stabilizing apparatus of claim 1, wherein the environment anchor comprises a ground spike.

14. The ladder stabilizing apparatus of claim 1, wherein the belt assembly further comprises a belt lock movable between a belt locked position, in which the belt lock inhibits unwinding of the stabilizing belt from the belt housing, and a belt unlocked position, in which unwinding of the stabilizing belt from the belt housing is uninhibited.

15. The ladder stabilizing apparatus of claim 14, wherein the belt assembly further comprises a user-operated belt lock release actuator that when actuated moves the belt lock from the belt locked position to the belt unlocked position.

16. The ladder stabilizing apparatus of claim 1, further comprising a retractable leg translatably coupled to the rail mount and translatable relative to the rail mount between a leg retracted position and a foot planted position, the retractable leg extending between a leg upper end and a leg lower foot, wherein the belt assembly is removably connectable to the retractable leg.

17. The ladder stabilizing apparatus of claim 1, comprising:

a plurality of rail mounts including the rail mount; and a plurality of auto-retracting belt assemblies including the auto-retracting belt assembly, wherein each of the belt assemblies is removably connectable to a corresponding one of the rail mounts.

18. A ladder comprising the ladder side rail and the ladder stabilizing apparatus of claim 1.

* * * * *